(12) United States Patent
Kundu et al.

(10) Patent No.: US 10,979,452 B2
(45) Date of Patent: Apr. 13, 2021

(54) BLOCKCHAIN-BASED MALWARE CONTAINMENT IN A NETWORK RESOURCE

(71) Applicant: International Business Machines Corporation, Armonk, NY (US)

(72) Inventors: Ashish Kundu, Elmsford, NY (US); Abhishek Malvankar, White Plains, NY (US); Suresh N. Chari, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 16/137,630

(22) Filed: Sep. 21, 2018

(65) Prior Publication Data

US 2020/0099698 A1    Mar. 26, 2020

(51) Int. Cl.
| | |
|---|---|
| *H04L 29/06* | (2006.01) |
| *H04L 12/24* | (2006.01) |
| *G06F 9/455* | (2018.01) |
| *G06F 16/27* | (2019.01) |
| *G06F 16/18* | (2019.01) |
| *G06F 16/182* | (2019.01) |

(52) U.S. Cl.
CPC ........ *H04L 63/145* (2013.01); *G06F 9/45558* (2013.01); *G06F 16/1805* (2019.01); *G06F 16/1834* (2019.01); *G06F 16/27* (2019.01); *H04L 41/12* (2013.01); *H04L 63/1416* (2013.01); *G06F 2009/45587* (2013.01)

(58) Field of Classification Search
CPC ............... H04L 63/145; H04L 63/1416; G06F 2009/4587
See application file for complete search history.

(56) References Cited

U.S. PATENT DOCUMENTS

| | | |
|---|---|---|
| 7,418,730 B2 | 8/2008 | Chu et al. |
| 7,743,419 B1 | 6/2010 | Mashevsky et al. |
| 7,757,291 B2 | 7/2010 | Rochette et al. |
| 8,065,731 B1 | 11/2011 | Nucci et al. |
| 8,266,699 B2 | 9/2012 | Oliphant |
| 9,553,890 B2 | 1/2017 | Wang et al. |

(Continued)

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Hosuk Song
(74) *Attorney, Agent, or Firm* — Law Office of Jim Boice

(57) ABSTRACT

A method contains malware within a network resource. A blockchain system establishes a smart contract, on the blockchain system, for a network resource in a computer environment. The smart contract is for an action to be performed on the network resource if a malware is detected on the network resource. In response to malware being detected in the network resource, the blockchain system determines whether a consensus is reached by a plurality of computers on the blockchain system to implement the action to contain the malware based on the smart contract. In response to the consensus being reached by the plurality of computers, the blockchain system transmits, to the network resource, directions to implement the action on the network resource as specified by the smart contract.

20 Claims, 15 Drawing Sheets

(56) References Cited

U.S. PATENT DOCUMENTS

| | | | |
|---|---|---|---|
| 9,849,364 B2* | 12/2017 | Tran | H04L 67/12 |
| 10,346,406 B2* | 7/2019 | Booz | G06Q 20/223 |
| 10,469,248 B2* | 11/2019 | Chalakudi | H04L 9/0618 |
| 10,540,704 B2* | 1/2020 | Mazed | G06Q 30/06 |
| 10,567,320 B2* | 2/2020 | Chalakudi | H04L 51/30 |
| 10,581,882 B2* | 3/2020 | Mehta | G06Q 20/36 |
| 10,601,907 B2* | 3/2020 | Bermudez Hernandez | H04L 9/3236 |
| 2005/0257269 A1 | 11/2005 | Chari et al. | |
| 2005/0278784 A1 | 12/2005 | Gupta et al. | |
| 2007/0289018 A1 | 12/2007 | Steeves et al. | |
| 2009/0172817 A1 | 7/2009 | Sedayao | |

OTHER PUBLICATIONS

Zhang et al. "Dynamic Malware Containment Under an Epidemic Model With Alert", Pysica A: Statistical Mechanics and Its Applications 470 (2017), pp. 249-260.

Yang et al., "The Impact of Patch Forwarding on the Prevalence of Computer Virus: A Theoretical Assessment Approach", Applied Mathematical Modelling 43 (2017), pp. 110-125.

Zheng et al., "Activ Cyber Defense Dynamics Exhibiting Rich Phenomena", Proceedings of the 2015 Symposium and Bootcamp on the Science of Security, ACM, 2015, pp. 1-12.

R. Wright, "Netskope Nabs Another Patent for CASB Technology", Techtarget, <http://searchsecurity.techtarget.com/blog/Security-Bytes/Netskope-nabs-another-patent-for-CASB-technology>, Aug. 18, 2016, pp. 1-2.

Anonymous, "Netskope Issued First Cloud Access Security Broker Patent for Real-Time Visibility and Control for Sanctions and Unsanctioned Apps", <https://www.netskope.com/press-releases/netskope-issued-first-cloud-access-security-broker-patent-for-real-time-visibility-and-control-for-sanctioned- and-unsanctioned-apps>, Netskope, Inc., Mar. 22, 2016, pp. 1-3.

D. Cid, "Log Analysis Using OSSEC", <https://pdfs.semanticscholar.org/presentation/4c83/0d0e6f809d8b145f1fab47fce2011e8b50cc.pdf>, 2007, pp. 1-46.

Anonymous, "Deep Packet Inspection & Analysis", <https://go.solarwinds.com/en/npm/deep-packet-inspection> Solarwinds, Retrieved Sep. 20, 2018, pp. 1-3.

J. Svoboda, "Network Traffic Analysis With Deep Packet Inspection Method", <http://is.muni.cz/th/250890/fi_m/dp-svoboda.pdf>, Masaryk University Faculty of Informatics, Master's Thesis, 2014, pp. 1-74.

* cited by examiner

BLOCKCHAIN-BASED MALWARE CONTAINMENT IN A NETWORK RESOURCE

BACKGROUND

The present invention relates to the field of blockchain, and particularly to blockchain that support network resources. Still more particularly, the present invention relates to preventing malware contamination of network resources using a blockchain.

Network resources include systems such as datacenters, cloud-based systems, etc. That is, a network resource is a resource that is accessible by a network. As such, a network resource is often vulnerable to attack. For example, a datacenter may be attacked by malware that not only affects a particular sub-system of the datacenter, but may also issue an alert that, based on the presence of the malware, causes the entire datacenter to shut down in order to contain the malware. However, a complete shut-down is often not required, since the malware often affects just certain components of the datacenter. This leads to a high cost of security and privacy breaches in systems within which the malware propagates within the system, such that recovery costs of the data in the datacenter and the systems/services that support and/or are supported by the datacenter is very high.

SUMMARY

In one or more embodiments of the present invention, a method contains malware within a network resource. A blockchain system establishes a smart contract, on the blockchain system, for a network resource in a computer environment. The smart contract is for an action to be performed on the network resource if a malware is detected in the network resource. In response to the malware being detected in the network resource, the blockchain system determines whether a consensus is reached by a plurality of computers on the blockchain system to implement the action to contain the malware based on the smart contract agreed between different parties. In response to the consensus being reached by the plurality of computers, the blockchain system transmits, to the network resource, directions to implement the action on the network resource as specified by the smart contract.

In other embodiments, the present invention as described in the method is implemented in a computer system and/or as a computer program product.

DETAILED DESCRIPTION

Figure 1:
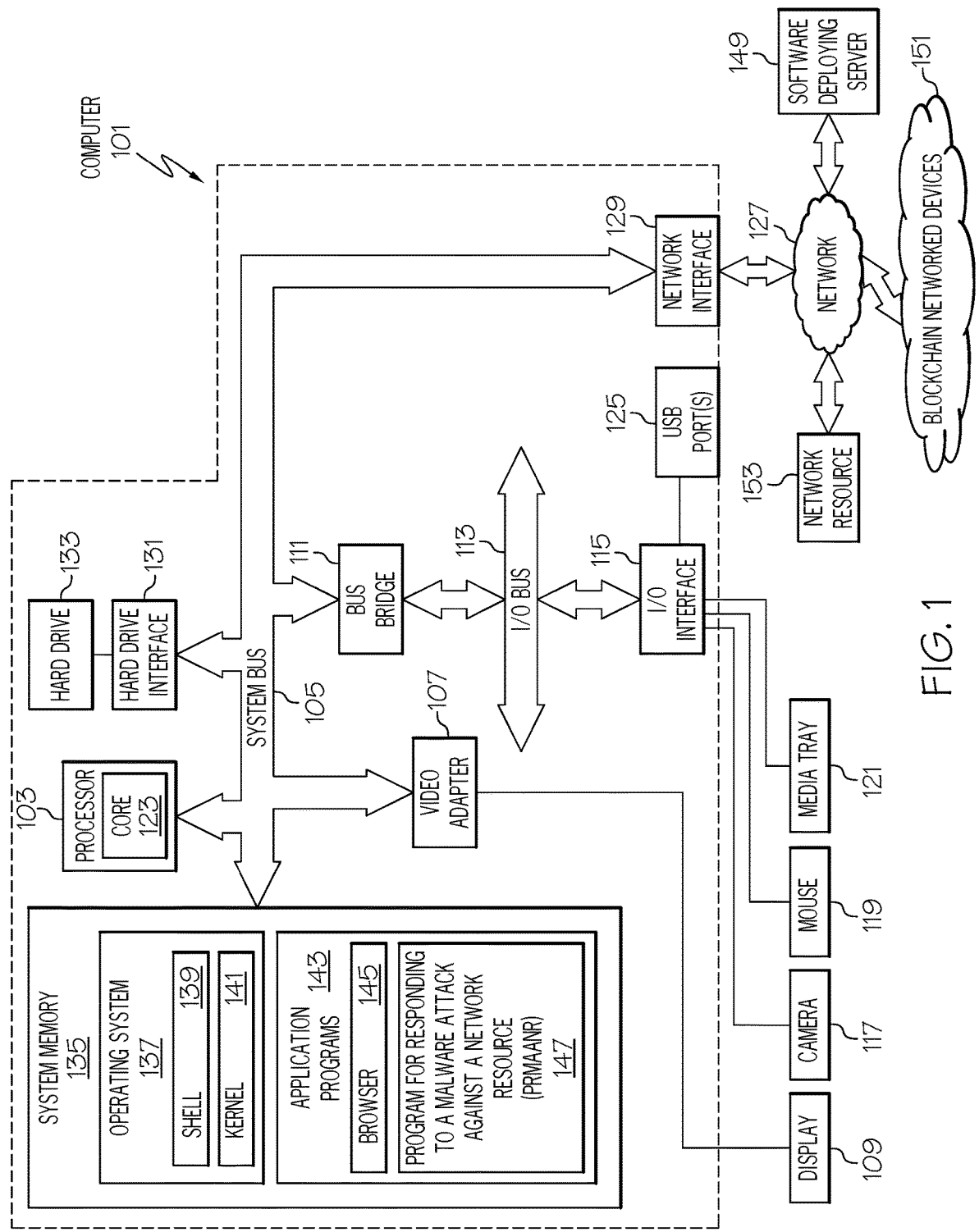
FIG. 1 depicts an exemplary system and network that is used in one or more embodiments of the present invention.

In one or more embodiments, the present invention is a system, a method, and/or a computer program product at any possible technical detail level of integration. In one or more embodiments, the computer program product includes a computer readable storage medium (or media) having computer readable program instructions thereon for causing a processor to carry out aspects of the present invention.

The computer readable storage medium is a tangible device that is able to retain and store instructions for use by an instruction execution device. In one or more embodiments, the computer is, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are capable of being downloaded to respective computing/processing devices from a computer readable storage medium or to an external computer or external storage device via a network, for example, the Internet, a local area network, a wide area network and/or a wireless network. In one or more embodiments, the network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

In one or more embodiments, computer readable program instructions for carrying out operations of the present invention comprise assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. In one or more embodiments, the computer readable program instructions execute entirely on the user's computer, partly on the user's computer, as a stand-alone software package, partly on the user's computer and partly on a remote computer or entirely on the remote computer or server. In the latter scenario and in one or more embodiments, the remote computer connects to the user's computer through any type of network, including a local area network (LAN) or a wide area network (WAN), or the connection is made to an external computer (for example, through the Internet using an Internet Service Provider). In some embodiments, electronic circuitry including, for example, programmable logic circuitry, field-programmable gate arrays (FPGA), or programmable logic arrays (PLA) execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions in one or more embodiments of the present invention.

In one or more embodiments, these computer readable program instructions are provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. In one or more embodiments, these computer readable program instructions are also stored in a computer readable storage medium that, in one or more embodiments, directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

In one or more embodiments, the computer readable program instructions are also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession are, in fact, executed substantially concurrently, or the blocks are sometimes executed in the reverse order, depending upon the functionality involved. It will also be noted that, in one or more embodiments of the present invention, each block of the block diagrams and/or flowchart illustration, and combinations of blocks in the block diagrams and/or flowchart illustration, are implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that are utilized in the one or more embodiments of the present invention. In accordance with various embodiments of the present invention, some or all of the exemplary architecture, including both depicted hardware and software, shown for and within computer 101 utilized by software deploying server 149 and/or devices within a network of blockchain networked devices 151 and/or a network resource 153 shown in FIG. 1.

In one or more embodiments of the present invention, exemplary computer 101 includes a processor 103 that is coupled to a system bus 105. Processor 103 utilizes one or more processors, each of which has one or more processor cores 123. A video adapter 107, which drives/supports a display 109 (which in one embodiment is a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which in one embodiment includes storage devices such as CD-ROM drives, multi-media interfaces, etc.), and external USB port(s) 125. While the format of the ports connected to I/O interface 115 is that which is known to those skilled in the art of computer architecture, including but not limited to universal serial bus (USB) ports.

As depicted, computer 101 is able to communicate with a software deploying server 149 and/or other devices/systems using a network interface 129. Network interface 129 is a hardware network interface, such as a network interface card (NIC), etc. In one or more embodiments, network 127 is an external network such as the Internet, or an internal network such as an Ethernet or a virtual private network (VPN). In one or more embodiments, network 127 is a wireless network, such as a Wi-Fi network, a cellular network, etc. As such, computer 101 and/or blockchain networked devices 151 and/or network resource 153 are devices capable of transmitting and/or receiving wireless and/or Internet broadcasts, streaming broadcasts, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Responding to a Malware Attack Against a Network Resource (PRMAANR) 147. PRMAANR includes code for implementing the processes described below, including those described in FIGS. 2-13. In one embodiment, computer 101 is able to download PRMAANR 147 from software deploying server 149, including in an on-demand basis, wherein the code in PRMAANR 147 is not downloaded until needed for execution. In one embodiment of the present invention, software deploying server 149 performs all of the functions associated with the present invention (including execution of PRMAANR 147), thus freeing computer 101 from having to use its own internal computing resources to execute PRMAANR 147.

The hardware elements depicted in computer 101 are not intended to be exhaustive, but rather are representative to highlight essential components required by the present invention. For instance, in one or more embodiments computer 101 includes alternate memory storage devices such as magnetic cassettes, digital versatile disks (DVDs), Bernoulli cartridges, and the like. These and other variations are intended to be within the spirit and scope of the present invention.

Malware propagation in a data-center/cloud leads to a high cost of security and privacy breaches in systems to which it propagates from the first victim. Furthermore, recovery cost of the data and the systems/services is very high.

As described herein, one or more embodiments of the present invention provides a method and system to contain a spread of malware in a network resource. In various embodiments of the present invention, the network resource is a datacenter, a cloud of computing resources, a computer system, and/or any other resource that is accessible by a network, and thus is vulnerable to attacks by viruses and other types of malware.

In accordance with one or more embodiments of the present invention, the processes described herein are triggered by a detection of malware on a network resource. In various embodiments of the present invention, such malware is detected using techniques such as context analysis (e.g., identifying program memory and registers inside a central processing unit—CPU that actually runs particular programs, in order to identify any anomalies within such memories and/or registers); performing an analysis of instruction execution logs, memory storage logs, etc. in order to determine whether a host system is infected with malware (e.g., using a Deep Packet Inspection (DPI) that inspects packet headers of network traffic packets being received by the host system; etc.).

As soon as malware is detected in a system (i.e., a network resource), the present invention contains the propagation of the malware throughout the system. In various embodiments of the present invention, the malware propagation is contained using an intelligent termination (removal) and/or quarantining (isolation) of infected nodes within the system.

Various embodiments of the present invention achieve this malware termination/quarantining by 1) taking into consideration a network topology of the infected system; 2) using Dominance Frontier (DOM Frontier) to pick a Dominance (DOM) point in the network topology; 3) using Machine Learning (ML) techniques for learning how to optimize and improve malware containment within the infected system; 4) applying ML techniques that utilize Support Vector Machines (SVMs), which are supervised learning models with associated learning algorithms that analyze data used for classification and regression analysis; and/or 5) applying a Least Cost Model (LCM), which determines a minimum number of resources (e.g., virtual machines used by the network resource/system) that need to be isolated and/or shut down in order to contain the malware.

In one or more embodiments of the present invention, the network resource that has been attacked by malware is a datacenter, which includes power subsystems, cooling subsystems, processing resources (i.e., processors), storage resources (e.g., system memory, cache systems, disc storage systems, etc.), etc. These components of the network resource can be graphed in a nodal graph, in which each node in the nodal graph represents a particular component of the network resource, and each line connecting two or more nodes represents physical connectors, dependencies, etc. between the nodes. Thus, this nodal graph provides a holistic view of connected nodes in a network resource such as a datacenter.

Once malware is detected, then one or more embodiments of the present invention use DOM frontier (Dominance Frontier) to identify dominant nodes in malware propagation and to contain/isolate them (or in a worst-case scenario, shut them down).

If nodes (dominant and dependent) are shut down, then in an embodiment of the present invention a cost optimization is performed by executing a multi-variant optimization technique. Once the cost of shutting down one or more nodes in the network resource is determined, the affected nodes are shut down in an order that is determined by the cost optimization process.

In one or more embodiments of the present invention, some or all of the steps just described above are fed back into a machine learning algorithm, in order to help the model of the network resource (depicted in the nodal graph) learn the type of attacks and to co-relate with different types of scenarios that provide optimized containment processes to be used in response to future attacks, in order to contain the malware.

As described herein, in one or more embodiments of the present invention the network resource that has been attacked by malware is a datacenter, which in various embodiments includes power subsystems, cooling subsystems as well as the computing resources. In an embodiment of the present invention, lists of known vulnerabilities are assigned to each vertex (node) in the graph that represents a component that can be exploited by a malware.

As soon as a malware is detected in the network resource, a malware nodal graph is built based on the components of the network resource and their vulnerability weights. That is, each component of the network resource is assigned a weight to indicate its vulnerability to malware, and the vulnerability weights are utilized in the creation of the malware nodal graph. The propagation information/characteristics about the malware (and its threat to certain components of the network resource) is obtained from existing literature and/or a database and/or a lookup table in one or more embodiments of the present invention.

In one or more embodiments of the present invention in which the network resource is a datacenter, the datacenter has numerous protocols for load balancing of packet transfers for increasing effective link utilization. That is, different load balancing protocols identify which components of the network resource are used during certain conditions (e.g., heavy traffic, suspicious activity, etc.). As such, various embodiments of the present invention provide a dynamic containment technique that varies according to each protocol. Thus, based on the protocol used for data transfer (since the malware will propagate according to the detected/used protocol), the following steps are performed in accordance with one or more embodiments of the present invention.

First, the system (e.g., computer 101 shown in FIG. 1) determines/identifies the potential network links being used by the network resource.

Next, the nodal graph of the network resource is analyzed in order to determine dominance frontiers with respect to the hosts that have been compromised.

Next, a threshold for Dominance (DOM) nodes (e.g., if the number of subsequent nodes that can be infected by the malware as passed down from a dominant node exceeds a certain number) is determined using a Bayesian (statistics-based) model or Epidemic (flow-based) model.

Next, the system carries out a cost analysis of containing the malware (i.e., determines what the cost is to the operation, trustworthiness, etc. of the system if certain nodes are isolated and/or turned off in order to contain the malware), performed according to various parameters.

For example, in an embodiment of the present invention containment is performed based on 1) minimizing the cost of the malware breach (depending on how many components are affected, the type of data being compromised, etc.); 2) minimizing the cost of shutting down systems and network in order to contain the malware (e.g., using a K-min cut algorithm); 3) minimizing a latency of containment (e.g., by turning off distributed load balancing protocols); 4) applying a multi-variate optimization technique that involves Service Level Agreements (SLAs), dependency information, etc. (e.g., in an embodiment it is unacceptable to shut down a database server if there is no backup server); 5) determining the network links, switches and other components in the datacenter network graph to be disabled or to allow only non-privileged traffic (i.e., in various embodiments components are disabled, or traffic that is not privileged is allowed to move even in the face of the malware); and 6) determining which order steps 1)-5) are performed.

Once the order of the actions is determined, then they are carried out (e.g., by disabling and/or isolating certain components of the network resource (i.e., the datacenter)).

The respective actions are then fed into a machine learning (ML) model, in order to train the system on how to handle future malware containment.

Thus, the overall idea of one or more embodiments of the present invention is to provide an intelligent response to malware. That is, the present invention provides an intelligent system that, rather than simply shutting down an entire system, only isolates/quarantines/turns off those components that need to be altered. As described herein, after there is a detection (e.g., by computer 101 shown in FIG. 1) of malware (e.g., in a datacenter such as network resource 153 shown in FIG. 1), malware propagation through the datacenter is limited by the presently presented intelligent termination.

This malware limiting/quarantine is achieved in one or more embodiments of the present invention by 1) evaluating a topology of the affected network resource; 2) applying a Dominance Frontier algorithm in order to select a DOM point (the head component that is attacked by the malware, which can then pass from that head component to other components in the network resource) from the topology of the affected network resource; and 3) using machine learning techniques for learning how the malware affects the datacenter/network resource. This machine learning can be supervised, unsupervised or semi-supervised and in such instances is SVM (Support Vector Machine) based, and/or can use a least cost model, which identifies the minimum number of components (e.g., virtual machines—VMs) within the network resource that need to be shut down in order to contain the malware (prevent it from spreading throughout the network resource/datacenter).

Thus, an embodiment of the present invention is directed to isolating only systems and network zones in a compromised system that are impacted by the detected malware. The determination of the process of containment makes use of graph properties such as dominator graphs, independent set/vertex cover, and network properties. The process of containment optimizes upon cost of isolation (keeping such costs to a minimum), ensures that business service level agreements (SLAs) are met, and ensures that business-critical systems are available.

An embodiment of the present invention determines groups of systems (zones for which a set of actions are carried out in a workflow) that are impacted by a detected malware. A containment plan is then formulated and executed. The containment plan includes the actions of: 1) issuing instructions to the network switches or routers to stop or suspend, or reduce network connectivity between two or more systems, or in a network zone such as a virtual local area network (VLAN); 2) directing a provisioning process to stop, suspending provisioning of VMs/containers in certain zones, etc.; and/or 3) directing a provisioning process to provision a virtual machine (VM) in a different zone that is not affected by the malware.

Figure 2:
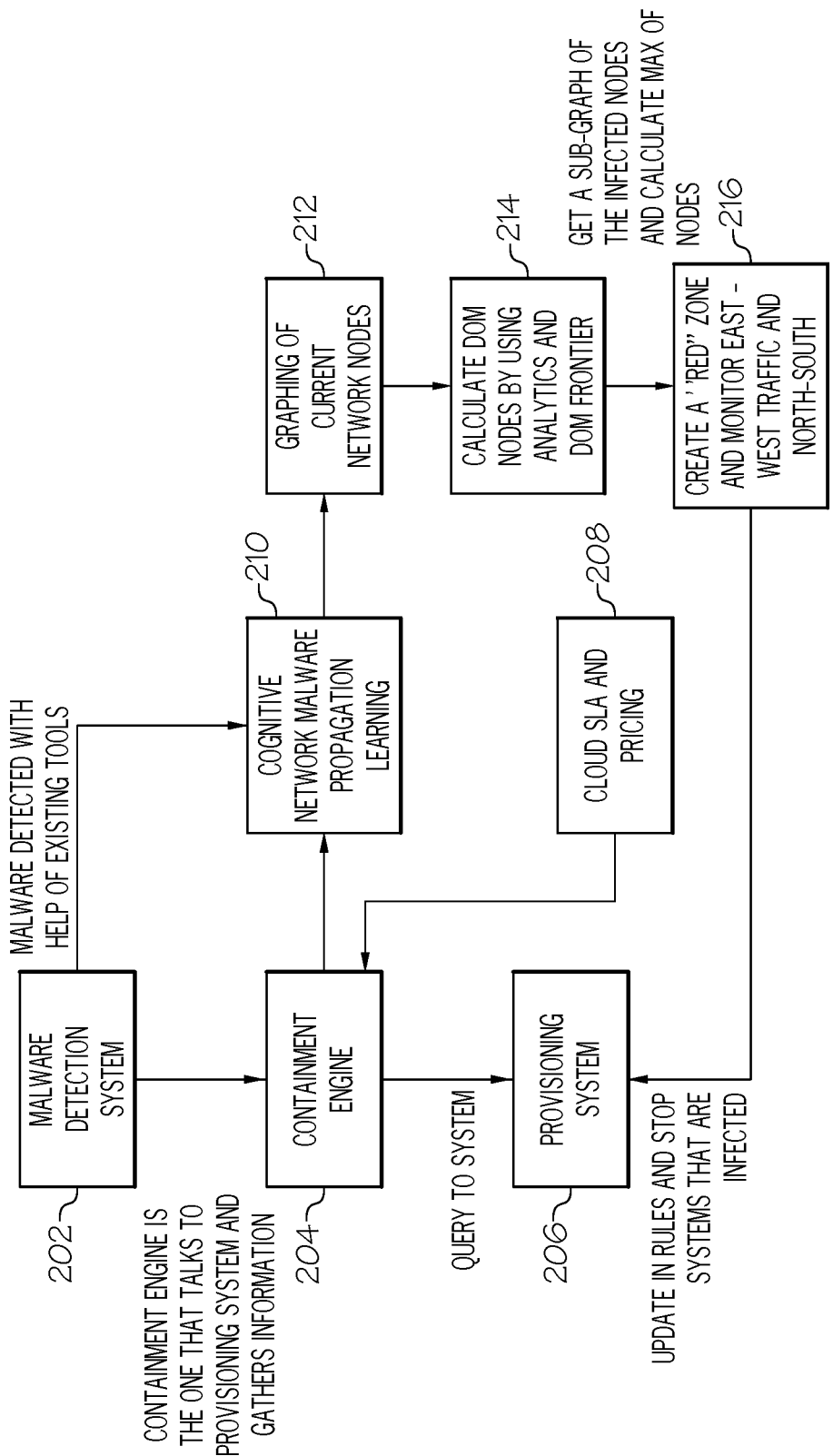
FIG. 2 depicts exemplary components of one or more embodiments of the present invention.

With reference now to FIG. 2, a high-level overview of components of the present invention in one or more embodiments is presented.

As shown in block 202, a malware detection system (e.g., that recognizes certain malware code and/or actions performed by certain code that, even though the code is not a known virus/malware, still causes the system to perform an action that is suspicious/irregular, thus suggesting that the code is malevolent) detects malware in the network resource (e.g., a datacenter, such as depicted in FIG. 1 as a network resource 153). The malware detection system then notifies a malware containment engine (shown as block 204), which in one embodiment is part of PRMAANR 147 shown in FIG. 1.

The containment engine sends a query to a provisioning system (block 206), which contains information about the topology of the network resource. The containment engine also receives information from a cloud service level agreement (SLA) and pricing agreement (block 208), which describes what level of service and cost is to be provided by the network resource to customers.

The malware detection system and containment engine direct a cognitive network malware propagation learning system (block 210) to graph current network nodes for the attacked network resource (block 212). As shown in block 214, the system calculates DOM nodes by using analytics and DOM Frontier.

Figure 3:
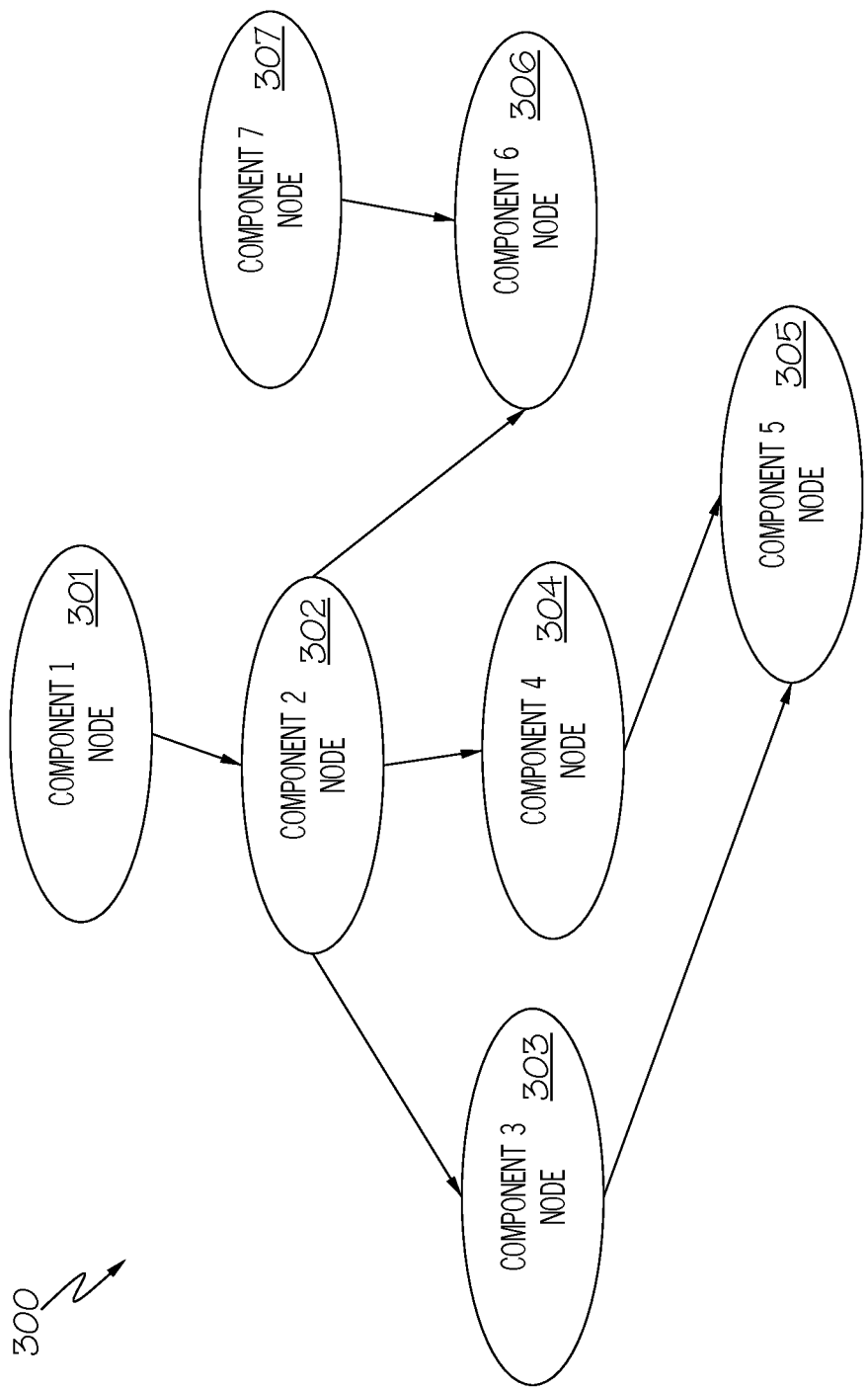
FIG. 3 illustrates an exemplary nodal graph, which depicts an exemplary network resource, as utilized in one or more embodiments of the present invention.

For example, consider the nodal graph 300 shown in FIG. 3, which is of components found in a network resource (e.g., a datacenter). Assume that Component 1 shown in node 301 is a server. Assume now that Component 2 shown in node 302 is a bus that connects the server to a hard drive (Component 3 shown in node 303) and a memory controller (Component 4 shown in node 304), which controls data to and from volatile memory (Component 5 shown in node 305). Assume also that the bus represented as Component 2 in node 302 also connects the server to a printer, shown as Component 6 in node 306. Assume further that this printer is also used by another server, shown as Component 7 in node 307.

Under DOM Frontier, Components 1-6 are the set of nodes/components that are all affected by the server depicted in node 301 (since each node dominates itself). As such, nodes 302-306 are immediately dominated by node 301 under DOM Frontier. However, node 307 is not impacted by node 301, and is not part of the dominance frontier (DOM Frontier) of node 301.

In an embodiment of the present invention, not only is the DOM Frontier created as just described, but the vulnerability to malware (e.g., any malware or a particular type of malware or a specific malware) of each of the nodes 301-306 is determined based on historical data, specifications/components of devices depicted in nodes 301-306, etc. This allows the system to determine the likelihood of a particular malware/type of malware being promulgated through one or more of the nodes in nodes 301-306.

Returning now to FIG. 2, since the system already has a description of the current topology of the network resource from the provisioning system (block 206), the system can create a sub-graph of the infected nodes and calculate the maximum nodes that will be impacted by the malware. This allows the system to create a "RED" zone (of potentially affected nodes), in order for the system to monitor horizontal (east-west) traffic between affected nodes in the graph (e.g., nodes 303, 304, and 306 shown in FIG. 3) and vertical (north-south) traffic between affected nodes (e.g., nodes 302, 304, and 305 shown in FIG. 3) in the graph (block 216).

As shown in FIG. 2, the created "RED" zone identifies which affected systems are to be stopped/isolated, and any rules for such stoppage/isolation are updated accordingly.

Thus, after malware has been detected (e.g., in a network resource such as a cloud system), a graph is generated of all vulnerable dominant nodes. The graph depicts network devices within the network resource, such as routers, switches, processors, etc. Datacenter policies are then applied to the graph in order to find out all the possible paths from the source node to destination node. That is, the datacenter policies identify which devices communicate with one another, in order to determine (using DOM Frontier) which components of the network resource are vulnerable to malware propagation.

In an embodiment of the present invention, the system then applies machine learning (ML) techniques to determine the FAN-OUT of malware and determine the nodes/network devices that needs to be shut down based on a cost based model using K-min cut algorithm.

In an embodiment of the present invention, the malware containment is controlled by a blockchain. That is, there are several stakeholders that are involved in making a decision on whether to shut down a system, a network port, a switch and so on. Such stakeholders include a customer, a cloud administrator, a compliance officer, a security officer, etc.

In order to ensure that the needs of the stakeholders are met, and to ensure that shut down procedures are properly (and necessarily) performed, a blockchain is utilized.

That is, rather than expose a network resource to malicious shutdowns (e.g., a shutdown of an entire system rather than only a smaller portion that is affected by malware), an embodiment of the present invention utilizes a blockchain to ensure that the appropriate shut down occurs.

That is, smart contracts codify the policies and requirements for system availability, shutdown, and incidence response policies. Ledgers in the blockchain keep track of malware propagation information, probabilistic indicators of compromise, and decisions taken by the smart contracts. A consensus of peers in the blockchain system is thus used to determine if there is an agreement to take an action to contain the malware.

Thus, rather than allow malware to not only affect components but also to shut down an entire system, a blockchain system will ensure that only the affected components are shut down.

As just stated, a preferred embodiment of the present invention utilizes a blockchain. Exemplary blockchains are described now in FIGS. 4-7.

Figure 4:
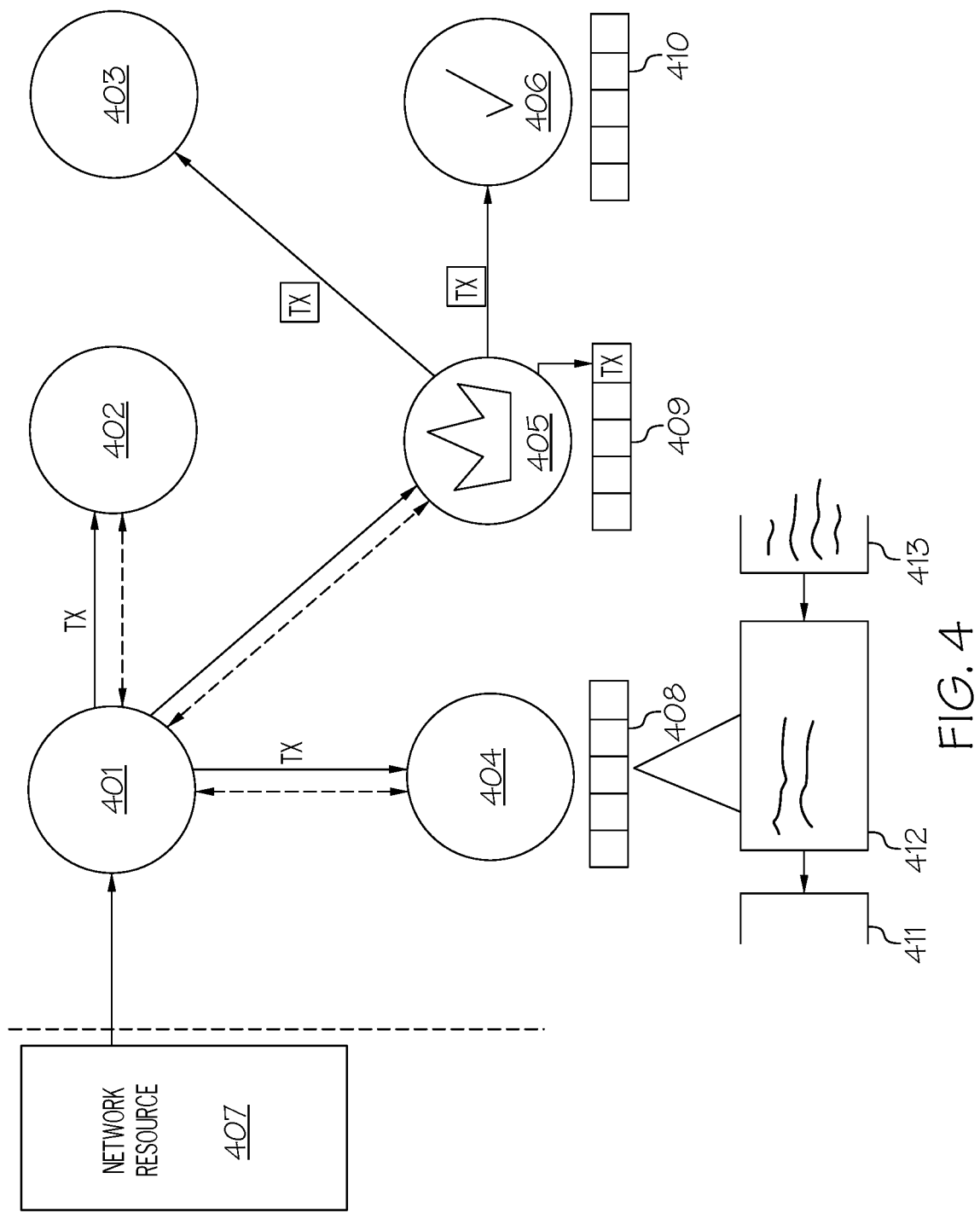
FIG. 4 depicts an exemplary blockchain architecture as used in one or more embodiments of the present invention.

With reference now to FIG. 4, an illustration of exemplary blockchains as used in one or more embodiments of the present invention is presented. As shown in FIG. 4, computers 401, 402, 403, 404, 405, and 406 (e.g., blockchain networked devices 151 shown in FIG. 1) represent an exemplary peer-to-peer network of devices used to support a peer blockchain (in which more or fewer computers/machines form the peer-to-peer network of devices). Each of the computers 401, 402, 403, 404, 405 and 406 (which are telecommunication devices, portable computers, servers, etc.) in the peer-to-peer network has a same copy of data (e.g., data that represents transaction events), as held in ledgers stored within the depicted blockchains 408, 409, 410 that are associated with respective computers 404, 405, 406.

As shown in FIG. 4, network resource 407 (e.g., a datacenter) sends a transaction Tx (e.g., a detection of malware within the network resource 407) to the network resource's peer (depicted as computer 401). Computer 401 then sends the transaction Tx to ledgers known as the depicted blockchains 408, 409, 410 that are associated with other peers, including the depicted computers 402, 404, 405.

Blocks within exemplary blockchain 408 are depicted as block 411, block 412, and block 413. Block 413 is depicted as a newest entry into a ledger held in blockchain 408, and includes not only the newest transactions but also a hash of the data from the older block 412, which includes a hash of the even older block 411. Thus, older blocks are made even more secure each time a new block is created, due to the hashing operations.

Figure 5:
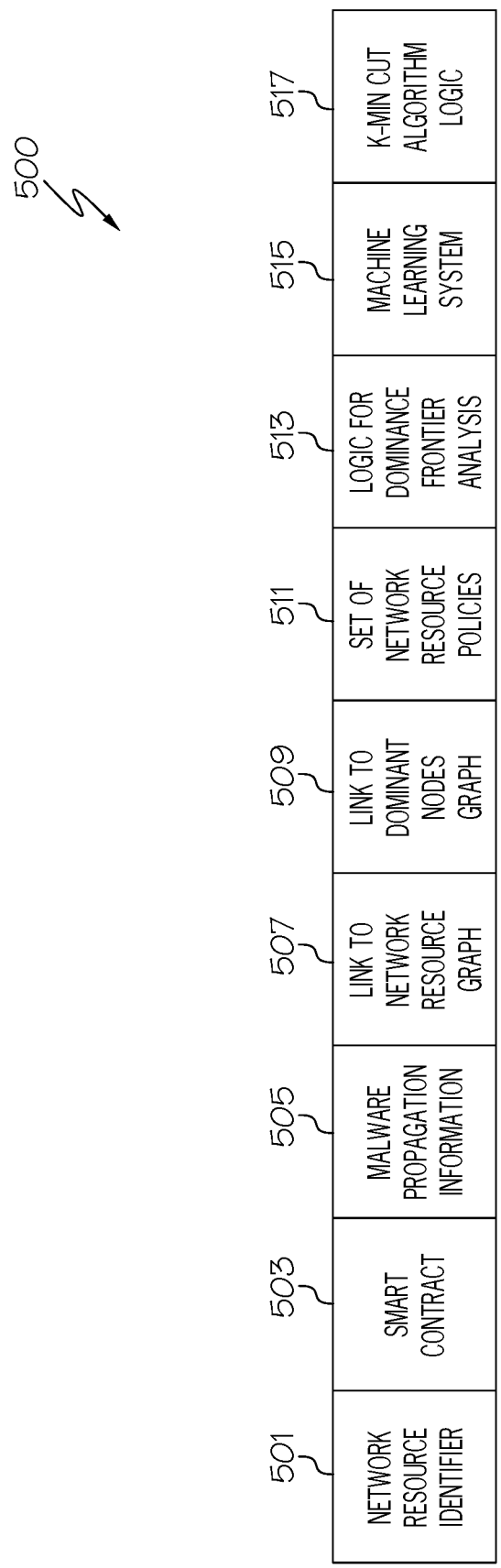
FIG. 5 illustrates an exemplary blockchain ledger as used in one or more embodiments of the present invention.

With reference now to FIG. 5, an exemplary blockchain ledger 500 within blockchain 408 is depicted. The blockchain ledger 500 includes an identifier of the network resource that has been infected with malware (block 501). Blockchain ledger 500 also includes a copy of the smart contract (block 503) that describes an agreement that 1) components of the identified network resource will be selectively shut down and/or isolated only if 2) directed to do so by the blockchain. This provides an additional layer of assurance that the appropriate level of isolation and/or shutting down occurs, since the directions are provided by the secure blockchain.

Block 505 of the blockchain ledger provides malware propagation information, which includes a description of the malware, how it historically propagates, etc. By using a link to a network resource graph (block 507), and a link to a dominant nodes graph (block 509) such as that shown in FIG. 3, the peers in the blockchain system are able to apply a set of network resource policies (block 511) to determine which components of the network resource are to be isolated, turned off, etc. For example, in an embodiment of the present invention a first network resource policy for a particular datacenter states that only affected storage devices are to be shut down in the event of a malware attack, while a second network resource policy for that datacenter states that all input/output ports are to be shut down in the event of a malware attack. Only one of these policies will be found in block 511, in order to allow the blockchain system to issue the appropriate order to the network resource/datacenter.

In an embodiment of the present invention, the blockchain system (e.g., blockchain networked devices 151 shown in FIG. 1) not only controls which components of the network resource 153 shown in FIG. 1 are shut down or isolated in response to detecting the malware, but the blockchain system also performs other operations shown in FIG. 2, as represented by block 513 (logic for dominance frontier analysis), block 515 (machine learning system), and block 517 (K-min cut algorithm logic).

Returning now to FIG. 4, computer 405 has been designated as a leader peer according to a consensus model of the peer-to-peer network. In order to be designated as the leader peer, computer 405 has to be the first to "guess" what the data in Tx is. That is, computer 401 encrypted Tx with a known one-way encryption algorithm (e.g., Secure Hash Algorithm 2-"SHA-2"). Since this is a one-way encryption algorithm, there is no way to know what was used as the input by simply reverse-engineering the encryption. However, blockchain protocols require that the leading bits in the encrypted (hashed) data follow a certain pattern, such as eight leading zeros followed by other bits (e.g., "00000000xxxxxxxxxxxx"). Thus, computer 405 simply used brute force to input many combinations of data into the SHA-2 algorithm until an output of "00000000xxxxxxxxxxxx" is achieved. Since the first eight bits were correct ("00000000"), then there is an assumption that the other bits ("xxxxxxxxxxxx") are also correct, since the odds of getting "00000000" correct but not getting "xxxxxxxxxxxx" are extremely small. Note that while computer 405 is working on this problem (of guessing what the input data to the SHA-2 algorithm by computer 401 is), other computers such as computers 401-404 and 406 are also working on the problem.

Assume now that computer 405 won the "race" to decrypt Tx before computers 401-404 and 406. Thus, computer 405 will send the data ("00000000xxxxxxxxxxxx") in a newly-encrypted form (using a key provided by computer 401) to one or more of computers 401-404 and 406. One or more of computers 401-404 and 406 will then check computer 405's work. For example, assume that Tx described network resource 407 being attacked by a particular malware. If the blockchain ledger decrypted by computer 405 shows that network resource 407 was attacked by another type of malware that makes no sense for network resource 407, then one or more of the computers 401-404 and 406 will assume that computer 405 did not accurately decrypt Tx. That is, if computer 405 decrypted block 505 in blockchain ledger 500 as showing that the malware is malware that attacks cell phones, and decrypted block 501 as showing that the affected network resource is a datacenter, then the computers 401-404 and 406 will know that computer 405 did not accurately decrypt Tx. However, if the blockchain ledger decrypted by computer 405 shows a type of malware (block 505) that is appropriate for a datacenter (block 501), then one or more of the computers 401-404 and 406 will assume that computer 405 accurately decrypted Tx. Once a predefined quantity of peer computers from computers 401-404 and 406 agree that the decrypted value of Tx is correct, then computer 405 will be designated as the leader peer for Tx. That is, the nodes/computers that receive the new block/transaction (Tx) then attempt to validate the new block/transaction. If enough (i.e., some predefined quantity/percentage) of the nodes/computers validate the new block/transaction, then the new block/transaction is deemed valid for the entire peer-to-peer network of computers 401-406 and is added to the blockchains (including the depicted blockchains 408, 409, 410) associated with all of the nodes/peers/computers 401-406.

As such, the leader peer (computer 405) organizes all transactions from the nodes/peers/computers/telecommunication devices 401-406, and then shares new blocks/transactions (Tx) with other nodes (e.g., computers 403, 406) as depicted.

In one or more embodiments of the present invention, the blockchains (including the depicted blockchains 408, 409, 410) are "anchored" to a particular user by adding to the block/transaction information such as that shown in FIG. 5.

Figure 6:
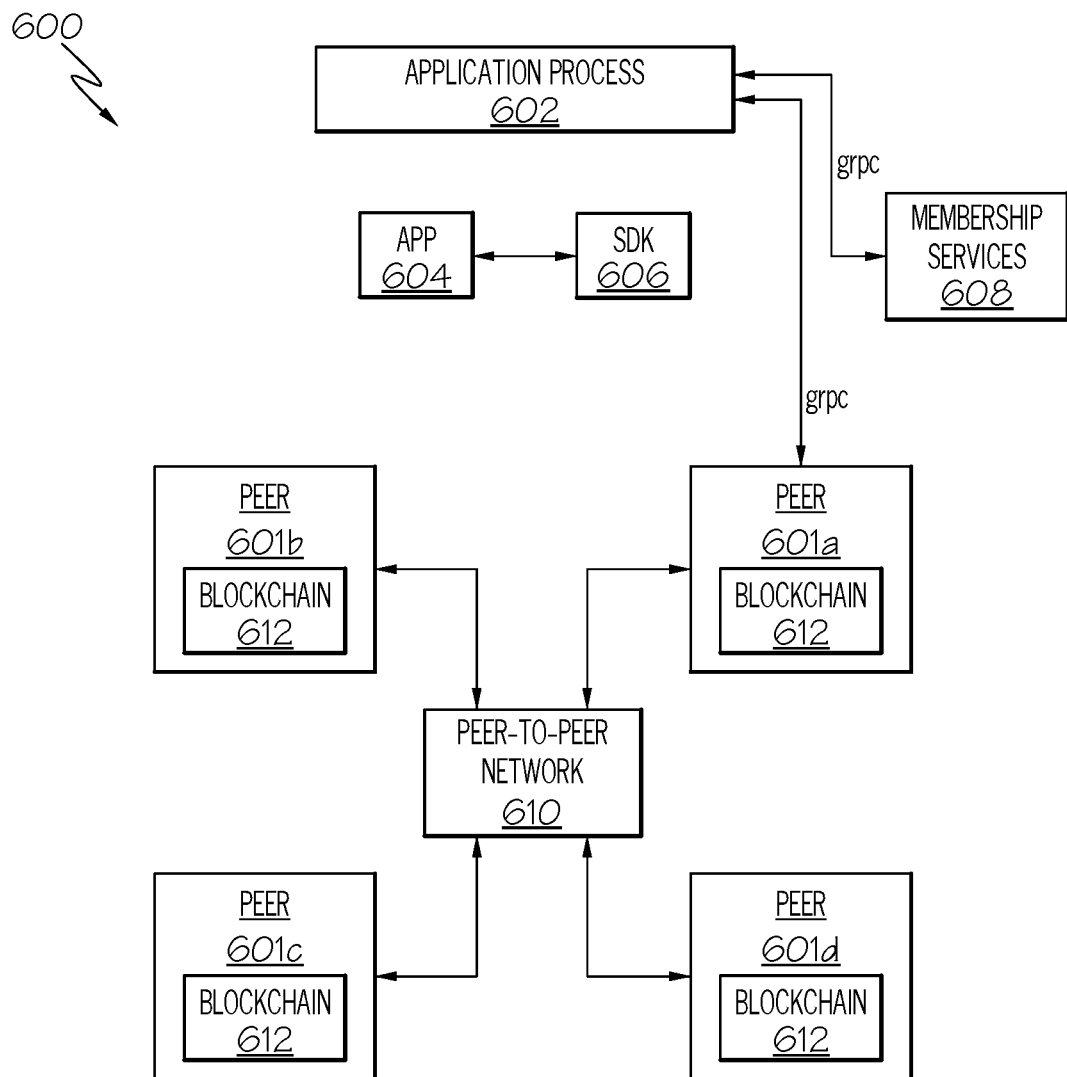
FIG. 6 depicts additional detail of an exemplary blockchain topology as used in one or more embodiments of the present invention.
Figure 7:
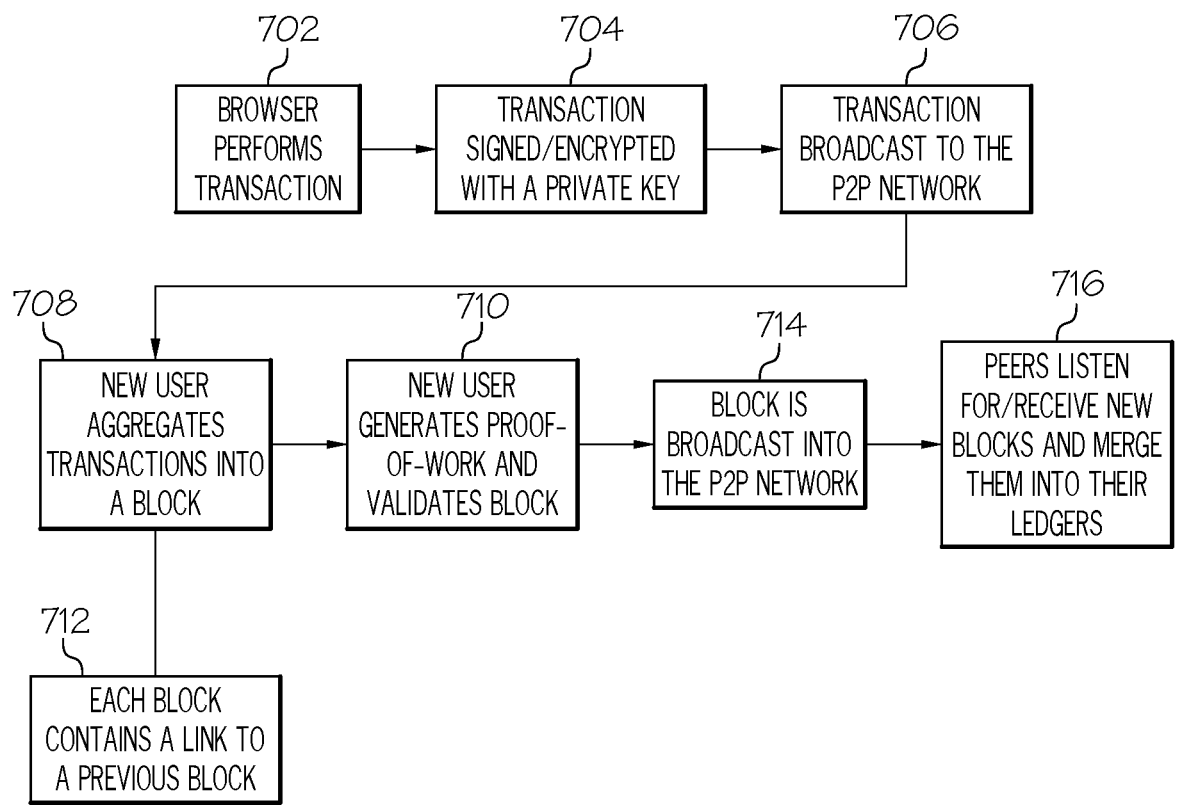
FIG. 7 illustrates a high-level use of a blockchain in accordance with one or more embodiments of the present invention.

With reference now to FIGS. 6-7, additional detail of a blockchain and its operation as used by the present invention is presented.

In one or more embodiments of the present invention, a blockchain fabric, such as blockchain fabric 600 depicted in FIG. 6, is used to provide the infrastructure (e.g. execution of the chaincodes) and services (e.g., Membership services such as Identity management) for securely and transparently storing, tracking and managing transactions on a "single point of truth". The blockchain fabric 600 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 600 (also known as and/or implemented in a the "blockchain system", "open blockchain" or "hyperledger fabric") is based on a distributed database of records of all transactions or digital events that have been executed and shared among participating parties. An individual transaction in the blockchain is validated or verified through a consensus mechanism incorporating a majority of the participants in the system. This allows the participating entities to know for certain that a digital event happened by creating an irrefutable record in a permissioned public ledger.

When a transaction is executed, its corresponding chaincode is executed by several validating peers of the system. For example, as shown in FIG. 6, peers 601a-601d (i.e., other computers, servers, etc.) establish the validity of the transaction parameters and, once they reach consensus, a new block is generated and appended onto the blockchain network. That is, an application process 602 running on a client (e.g., network resource 407 shown in FIG. 4) executes an application such as the depicted App 604, causing a software development kit (SDK) 606 to communicate using general remote procedure calls (grpc) to membership services 608 that support the peer-to-peer network 610 that supports the blockchain 612 using the peers 601a-601d.

Exemplary operation of the open blockchain fabric 600 shown in FIG. 6 is presented in FIG. 7. As described in step 702, a browser (e.g., network resource 407 shown in FIG. 4) performs a transaction (e.g., that identifies a detection of a malware attack). As shown in step 704, the client (e.g., network resource 407) signs and encrypts the transaction with a private key, such as SHA-2. This SHA-2-encrypted transaction is then broadcast to the peer-to-peer network 610, as described in step 706. A new user (e.g., peer 601c) aggregates the transaction(s) into blockchain 612, as shown in step 708. As shown in block 712, each block contains a link to a previous block. The newly-revised blockchain 612 is validated by one or more of the other peers in peers 601a-601d (step 710), and is then broadcast to the peers 601a-601b and peer 601d, as described in step 714. These peers 601a-601b and peer 601d listen for and receive the new blocks and merge them into their copies of blockchain 612 (step 716).

Thus, the open blockchain fabric 600 shown in FIG. 6 is a blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

That is, the open blockchain fabric 600 shown in FIG. 6 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

Figure 8:
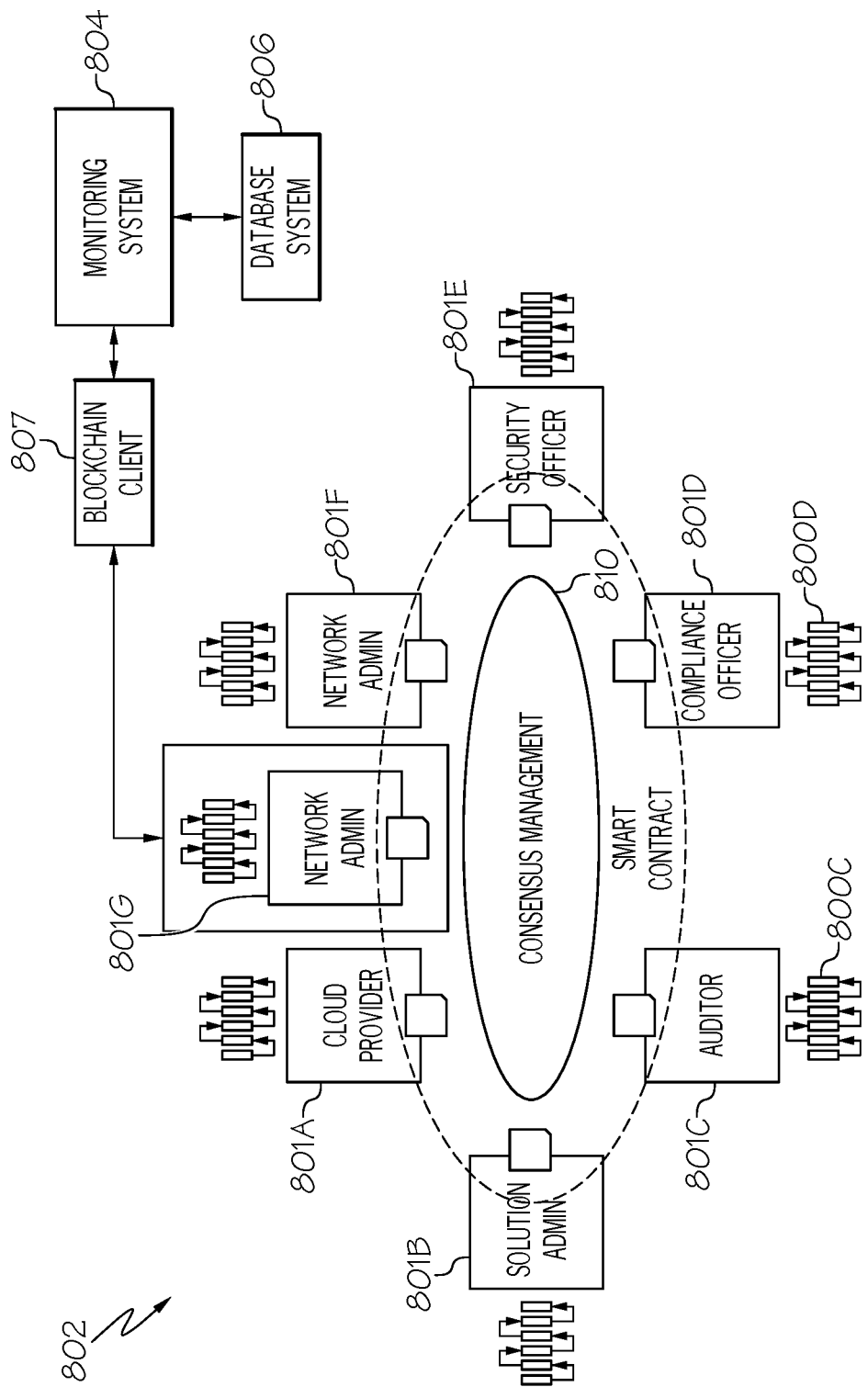
FIG. 8 depicts an exemplary malware containing blockchain network as utilized in one or more embodiments of the present invention.

FIG. 8 depicts an exemplary malware containing blockchain network 802 as utilized in one or more embodiments of the present invention. The term "malware containing blockchain network" indicates that the blockchain network 802 is able to contain malware (i.e., prevent malware from promulgating) by removing it from infected code, preventing it from infecting other code, etc.

As shown in FIG. 8, consensus management 810 is a blockchain system, such as peer-to-peer network 610 shown in FIG. 6, whose peers 801a-801g are structurally similar to the peers 601a-601d shown in FIG. 6. However, in FIG. 8, each of the peers 801a-801f are associated with a particular party/shareholder. For example and in one or more embodiments of the present invention, peer 801a is associated with a cloud provider that provides access to cloud resources; peer 801b is associated with a solution administrator that oversees resolution of malware issues in a database system; peer 801c is associated with an auditor that monitors activities within a database system; peer 801d is associated with a compliance officer that ensures that a database system complies with enterprise performance rules regarding the functionality of the database system; peer 801e is associated with a security officer who ensures that a database system is protected from attacks; and peer 801f is associated with a network administrator who oversees a database system.

In addition to peers 801a-801e discussed above, peer 801g, shown as a monitoring node, is a specialized peer that is dedicated as an entry point to the blockchain system (consensus management 810) for the blockchain client 807. That is, the blockchain client 807 receives messages from a monitoring system 804, which monitors a resource such as a database system 806. If the monitoring system 804 sends a message to the blockchain client 807 indicating that it has detected a malware occurrence within the database system 806, then the blockchain client 807 sends a transaction to the blockchain consensus management 810 via the specialized peer 801g. This allows the blockchain consensus management 810 to contain/limit the malware in the database as described herein.

As shown in FIG. 8, each of the peers 801a-801g include a copy of a ledger 800, which is analogous to ledger 500 shown in FIG. 5, and as identified by exemplary ledger 800c and ledger 800d in FIG. 8.

Figure 9:
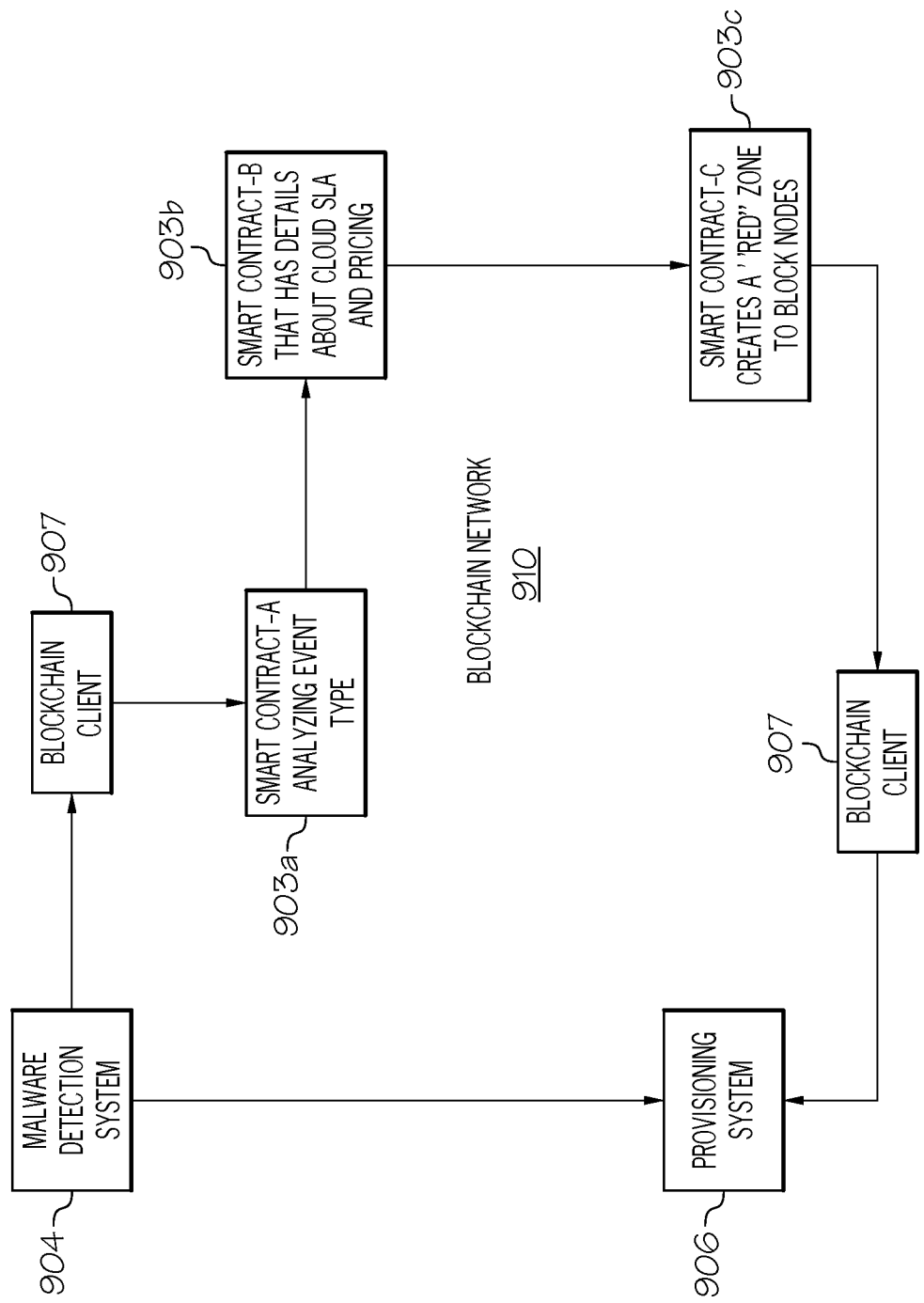
FIG. 9 illustrates an alternative description of one or more components of the present invention.

With reference now to FIG. 9, an alternative description of one or more components of the present invention is presented.

As shown in FIG. 9, a blockchain network 910 (analogous to peer-to-peer network 610 shown in FIG. 6) manages contracts found in a ledger (e.g., ledger 500 shown in FIG. 5).

That is, in FIG. 9 a malware detection system 904 (analogous to monitoring system 804 shown in FIG. 8) detects a malware issue in a resource (e.g., database system 806 shown in FIG. 8). A message (indicating that malware has been detected in database system 806) is sent to a blockchain client 907 (analogous to blockchain client 807 shown in FIG. 8), which interfaces with the blockchain network 910 in order to make a decision on how to handle the malware according to smart contracts that are within the blockchain network 910.

For example, a smart contract A (element 903*a*) is a smart contract that requires peers within the blockchain network 910 to analyze what type of malware event has been detected by the malware detection system 904. Based on the type of malware event that has been detected, a smart contract B (element 903*b*) has details about cloud service level agreements, pricing, etc. that are applicable to handling the type of malware event that has been detected. This leads to a smart contract C (element 903*c*), which defines a quarantine "RED" zone in the database system for containing (isolating/deleting) the malware in the database system. For example, in an embodiment of the present invention, this "RED" zone is defined as certain servers with the database system that are to be isolated until the malware issue is resolved.

The description of the "RED" zone is sent back to the blockchain client 907, which then sends instructions to the provisioning system 906 (analogous to provisioning system 206 shown in FIG. 2) to update rules for the database system to stop/isolate sub-systems (e.g., servers, storage devices) within the database system that are infected with the malware. In an embodiment of the present invention, this message includes instructions to amend or delete the malware, such that it no longer poses a threat to the database system.

As described then in the embodiment of the present invention shown in FIG. 9, a logging message is preprocessed by "Smart Contract-A", which analyzes types of events and triggers other smart contracts based on classifying events. An event, when classified, goes to a cloud SLA smart contract to figure out the type of SLA. For example, if uptime is very high, then the SLA will require that a new instance be spun up in some other zone, and thus the provisioning system is so informed. Since the smart contract demands uptime this has been added to the ledger and another smart contract is called that is used to contain malware in the cloud by creating a RED zone, this information also gets added to the ledger. Thus, since new information has been added to the ledger, this results in 1) spinning up a new instance of the currently affected system, and 2) creating the RED zone. Such information is then conveyed to the provisioning system by the client.

Figure 10:
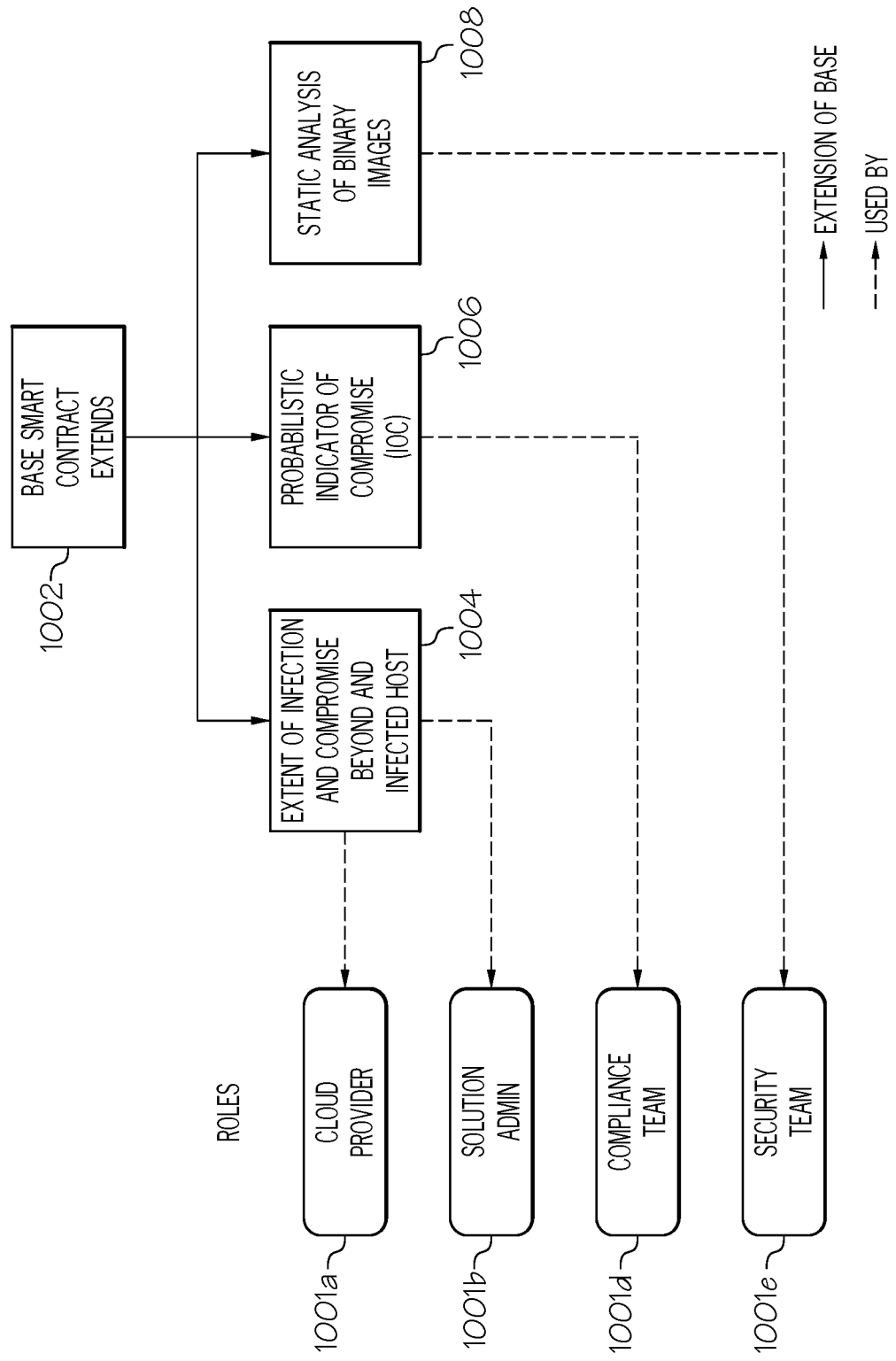
FIG. 10 depicts an overview of how a smart contract managed by a blockchain system is extended in accordance with one or more embodiments of the present invention.

With reference now to FIG. 10, an overview of how a smart contract managed by a blockchain system is extended in accordance with one or more embodiments of the present invention is presented.

As indicated in block 1002, a base smart contract is extended based on an extent of infection and compromise beyond and within an infected host (block 1004), a probabilistic Indicator of Compromise (IOC) as shown in block 1006, and/or a static analysis of binary images (block 1008).

That is, the blockchain system described here processes the base smart contract in order to determine the extent of the malware infection, beyond that which is detected by the monitoring system 804 shown in FIG. 8. For example, if the monitoring system 804 detects that a certain storage device in a database system is infected with malware, then the smart contract can be extended by logic within the blockchain system determining that other storage devices, within or outside of the database system, will also be infected by the malware if it is not contained immediately (block 1004). This information is used by the cloud provider 1001*a* (analogous to a user of the peer 801*a* shown in FIG. 8) and solution administrator 1001*b* (analogous to a user of the peer 801*b* shown in FIG. 8) to respectively provide cloud resources to oversee the solution to the malware invasion.

The blockchain system described herein also extends the base smart contract through the user of a probabilistic Indicator of Compromise (IOC)—see block 1006. That is, Indicators of Compromises (IOCs) are forensic artifacts of an intrusion that can be identified on a host or network, such as a database system. These forensic artifacts include, but are not limited to, error messages such as data overflows, system shutdown messages, unexpected operations (e.g., a disc storage device spinning up even though no data is being read from or written to that disc storage device), etc. This allows a compliance team 1001*d* (analogous to the user of the peer 801*d* shown in FIG. 8) to ensure that the database system performs in accordance with service level agreement (SLA) requirements.

The blockchain system described herein also extends the base smart contract through the use of a static analysis of binary images—see block 1008. That is, binaries are analyzed in order to determine what type of malware is attacking the database system (based on an analysis of the binaries that make up the malware) and where the attack is occurring (based on an analysis of binaries being output from the database system). This allows a security team 1001*e* (analogous to the user of the peer 801*e* shown in FIG. 8) to confirm the malware detection made by the monitoring system 804 shown in FIG. 8.

Thus, the roles depicted by elements 1001*a*, 1001*b*, 1001*d*, and 1001*e* are depicted in FIG. 10 in a hierarchical manner according to how each element/role/actor is impacted by SLA requirements of the database system.

In the embodiment thus presented in FIG. 10, a base smart contract is provided that determines the mandatory fields such as type of event, consensus mechanism and resolution that is needed to resolve issues such as malware attacks. According to the roles of each node and SLA requirement, the base smart contract is extended and used to: 1) calculate the risk of a particular event; 2) predict a probability of the risk using various indicators of compromise existing in the ledger; and 3) determine the incidence response policy.

The incidence response policy includes: 1) which node(s) need to shut down in response to the malware being detected; and 2) which virtual local area networks (Vlans) need to be isolated in various environments in order to ensure SLA compliance.

The final action that needs to be taken (to contain the malware) is performed by a consensus mechanism (provided by peers in the blockchain) as defined in the base smart contract. In an embodiment of the present invention, this consensus mechanism also determines the priority of the malware attack incident and turn-around-time to fix the issue. Such information is presented in the base smart contract as a mandatory policy.

Figure 11:
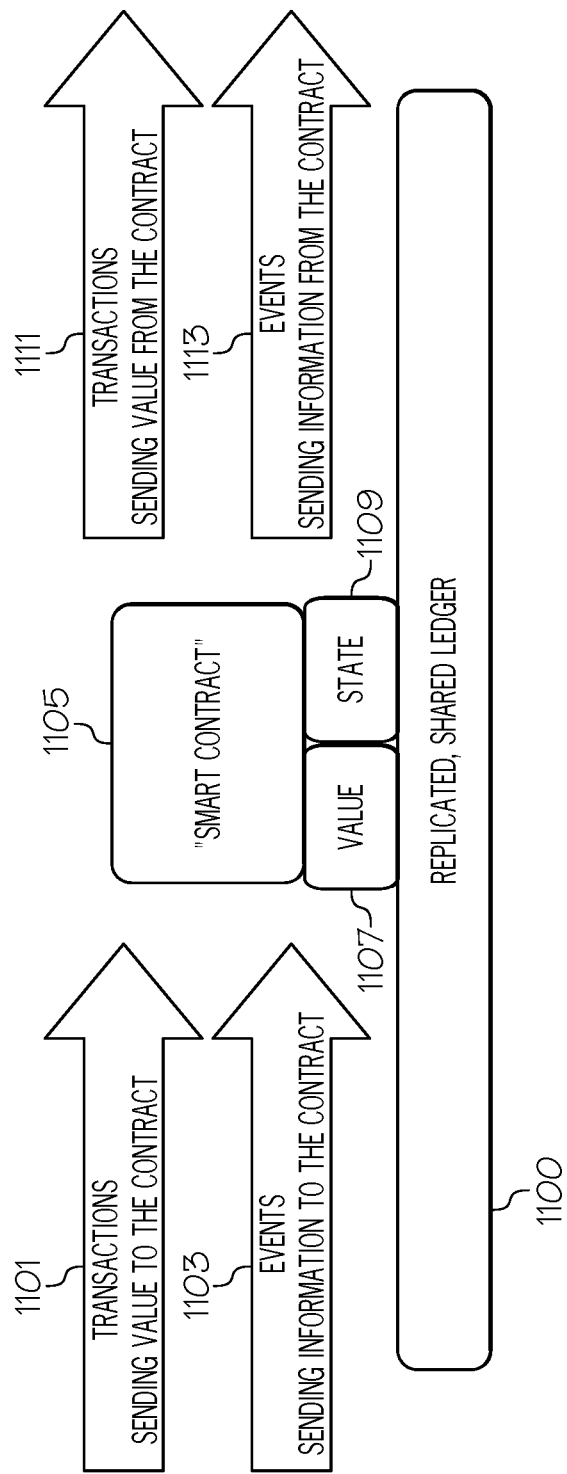
FIG. 11 illustrates additional detail of an operation of a "smart contract" as used in a blockchain environment in accordance with one or more embodiments of the present invention.

With reference now to FIG. 11, additional detail of an operation of a "smart contract" as used in a blockchain environment in accordance with one or more embodiments of the present invention is presented.

In one or more embodiments of the present invention, each node in the blockchain network has a copy/replication of a smart contract that determines what action is to be taken according to business rules. Thus, as shown in FIG. 11, a transaction 1101 (analogous to the Tx's shown in FIG. 4 that contain values of data associated with the transaction, such as a level of malware attack) and events 1103 (that contain information describing the malware attack, such as the sub-systems that are affected in the database system) are sent to the smart contract 1105, which includes information from the transaction 1101 (value 1107) and the events 1103 (state 1109). The smart contract 1105 including value 1107 and events 1109 are incorporated and replicated to a shared ledger 1100 (analogous to ledger 500 shown in FIG. 5), which is forwarded on to other nodes in the blockchain environment/fabric as outputs from the smart contract 1105 as transactions 1111 and events 1113.

Figure 12:
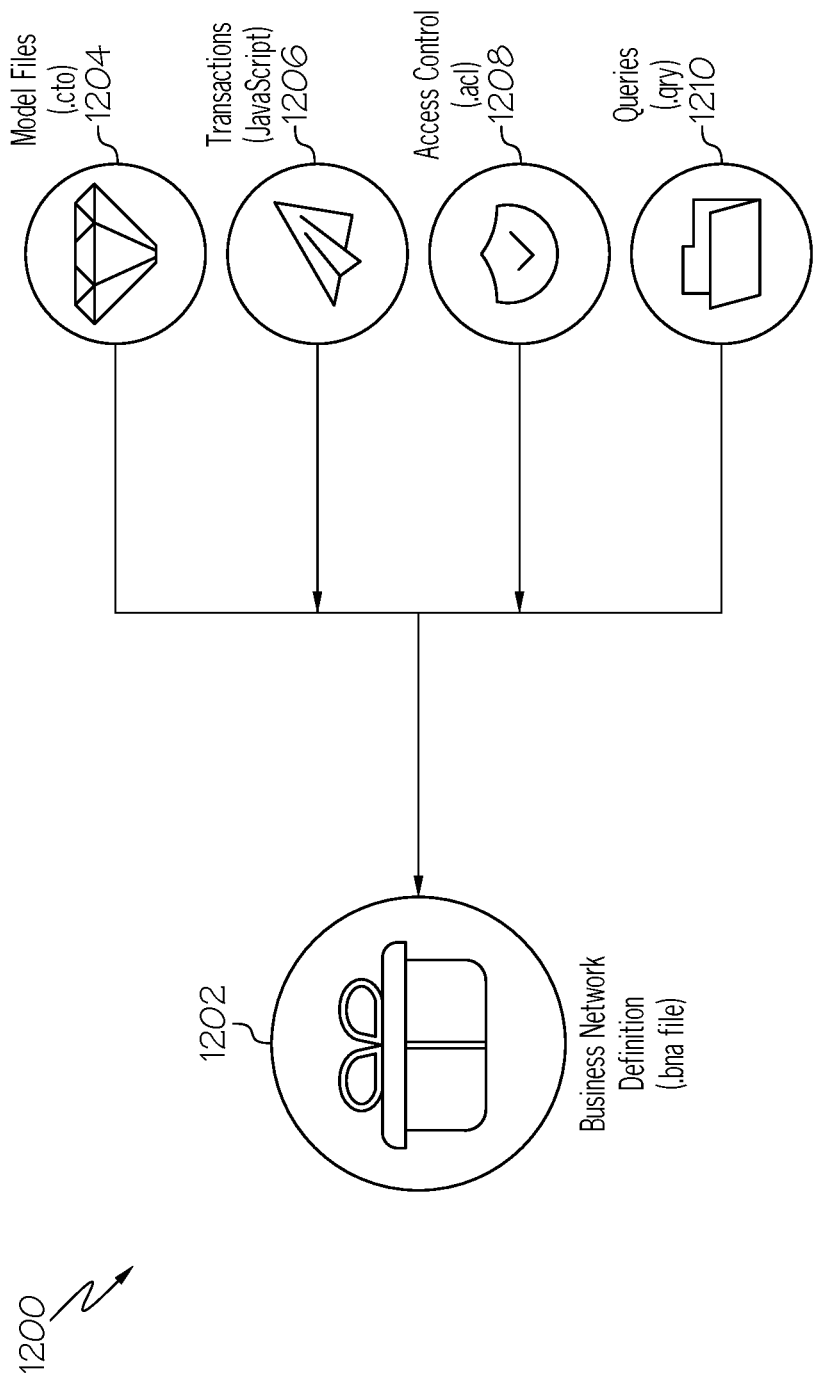
FIG. 12 depicts an embodiment of the present invention as described by a business network definition.

With reference now to FIG. 12, an embodiment of the present invention is presented according to use of a business network definition 1202. That is, in an embodiment of the present invention, a business network definition 1202 is used to interface with the blockchain(s) and their fabrics that are described herein. Thus, the business network definition 1202 consists of 1) model files that define resources such as assets, participants, transaction and events; 2) enumerated types that define the types of values that can be used; and 3) concepts presented as abstract classes.

More specifically and as depicted in FIG. 12, the business network 1202 is created by a combination of model files 1204, transactions 1206, access control 1208, and queries 1210.

Model files 1204 define the business domain for a business network such as the blockchain(s) described herein, while the JavaScript files in the transactions 1206 contain transaction processor functions. The transaction processor functions run on a Hyperledger Fabric and have access to the asset registries that are stored in the world state of the Hyperledger Fabric blockchain. In one or more embodiments of the present invention, model files 1204 are created by business analysts, since they define the structure and relationships between the model elements of assets, participants and transactions.

Transactions 1206 are the mechanism by which participants interact with assets. For example, in an embodiment of the present invention a transaction is a request for and a retrieval of data from a database system.

Access control 1208 to the blockchain(s) described herein are based on access control rules, which allow fine-grained control over what participants have access to what assets in the business network (e.g., the database system) and under what conditions.

Queries 1210 are used to extract data and blockchain world-state from the blockchain fabrics described herein.

Once defined, the Business Network Definition 1202 is packaged into an archive, which is then deployed or updated on the blockchain fabric described herein.

Figure 13:
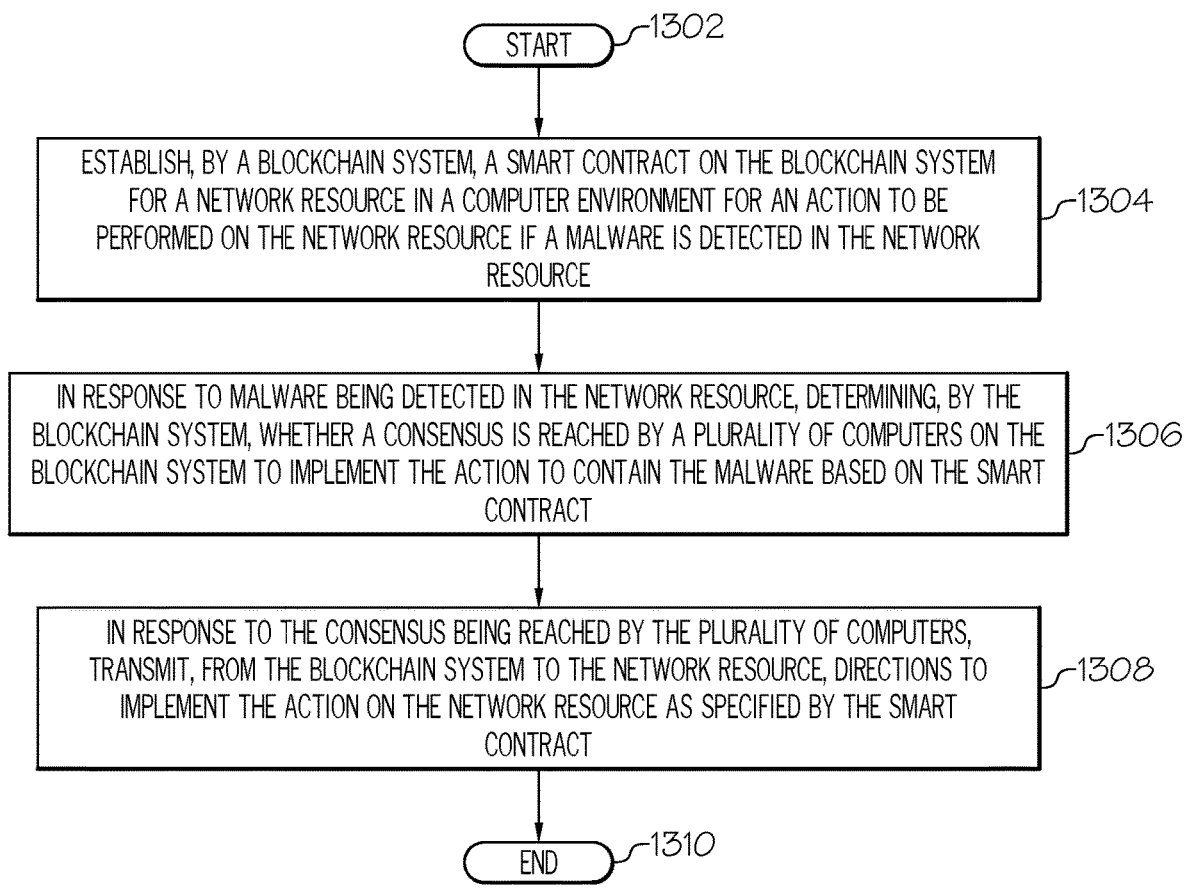
FIG. 13 is a high-level flow-chart of one or more steps performed in a processor-based method in accordance with one or more embodiments of the present invention.

With reference now to FIG. 13, a high-level flow-chart of one or more operations performed in accordance with one or more embodiments of the present invention is presented.

After initiator block 1302, a blockchain system (e.g., blockchain network devices 151 shown in FIG. 1) establish a smart contract on the blockchain system for a network resource in a computer environment for an action to be performed on the network resource if a malware is detected in the network resource, as shown in block 1304. That is, the blockchain system develops the smart contract on behalf of the network resource (e.g., a datacenter). In an alternative embodiment, this smart contract is created by a network resource administrator and/or some other stakeholder in the network resource (e.g., a user of the network resource).

As shown in block 1306 in FIG. 13, the blockchain system, in response to malware being detected in the network resource (e.g., by the network resource itself or alternatively, by logic within the blockchain system) determines whether a consensus is reached by a plurality of computers on the blockchain system to implement the action to contain the malware based on the smart contract (see FIGS. 2-12).

As described in block 1308 in FIG. 13, the blockchain system, in response to the consensus being reached by the plurality of computers, transmits, to the network resource, directions to implement the action on the network resource as specified by the smart contract. Thus, the present invention assigns the authority to determining and directing which components of the network resource are shut down or isolated in response to the malware, thus providing a new and useful layer of protection that prevents unnecessary shutdowns of components of the network resource.

The flow-chart shown in FIG. 13 ends at terminator block 1310.

In an embodiment of the present invention described in FIG. 2, a network resource graph (e.g., nodal graph 300 shown in FIG. 3) is used in determining which components of the malware-attacked network resource are to be shut down, isolated, etc. As described herein, one or more processors (e.g., within computer 101 and/or within the blockchain networked devices 151 shown in FIG. 1) generate a network resource graph of the network resource. The network resource graph depicts connections between nodes that depict network devices in the network resource. The processor(s) generate a dominant nodes graph of dominant nodes in the network resource graph (see FIG. 3), which depicts a dominance frontier of the nodes in the network resource graph. The processor(s) apply a set of network resource policies on the dominant nodes graph in order to determine a set of paths from a source node to a destination node, and also apply a dominance frontier analysis from the source node to calculate sets of nodes in the network resource that can be affected by the malware. The processor(s) utilize a machine learning system to determine potential malware spread pathways of the malware through resources depicted by the sets of nodes in the network resource that can be affected by the malware, and then determine a particular set of nodes, from the sets of nodes in the network resource that can be affected by the malware, that represent resources that need to be shut down based on a cost based model using a K-min cut algorithm (i.e., an algorithm that finds a set of edges between nodes in the graph whose removal would partition the graph to at least k connected components). The processor(s) then shut down the resources that are represented by the determined particular set of nodes.

As described herein, in an embodiment of the present invention the network resource is a datacenter that includes input/output interfaces, storage devices, routers, switches, etc. used to receive, store, and supply data to requesters. Thus, the malware is generally attacking multiple components of the datacenter.

In an embodiment of the present invention, the network resource is just a component of a datacenter, and the network resource is from the group consisting of a computer, a network port, a switch and a virtual machine used by the datacenter. Thus, the malware is only attacking a particular component of the datacenter.

In an embodiment of the present invention, the plurality of computers are used by a plurality of users that direct the blockchain system to establish the smart contract, and the plurality of users comprise a client user of the datacenter, a cloud administrator of a cloud upon which the datacenter resides, a compliance officer for the datacenter, and a security manager for the datacenter.

In an embodiment of the present invention, the smart contract codifies policies and requirements for network resource availability, network resource shutdown, and network resource incidence responses for the network resource.

In an embodiment of the present invention, ledgers (see FIG. 5) on the blockchain system keep track of malware propagation information about the malware, probabilistic indicators of compromise about the malware, and identification information about the malware.

As described herein, one or more embodiments of the present invention provide a system in which malware detection is performed and an alert is generated by monitoring system. The monitoring system talks to a blockchain client, and the client posts information into the blockchain ledger.

Exemplary pseudocode for posting information to the blockchain ledger is:

[{"$class": "com.abc.alert.CRITICAL",
"UUID":"<someUUID format>",
"information": "Malware detected on host 192.168.2.1 on VLAN 1"
"urgent": "True"
}]

The information added to the ledger is made available to all the peers. In an embodiment of the present invention ledgers have other metadata information, such as the range of Internet Protocol (IP) addresses used, the total number of switches in the network, the geo-location about the cluster of system where compliance is needed, etc.

The decision on how to handle events is performed by the smart contract described herein. In one or more embodiments of the present invention, a network has a base smart contract and multiple extended smart contracts.

In an embodiment of the present invention, each smart contract is owned by multiple parties, such as a solution administrator, a cloud administrator, etc.

As described herein, in one or more embodiments of the present invention a malware detection event is added to a blockchain ledger.

In an embodiment of the present invention, a prediction of the malware intrusion events is achieved by analysis of events in the ledger by the smart contract. That is, peers within the blockchain implement the smart contract by evaluating transactions in the ledger that described the malware attack, and then take appropriate actions to isolate or remove the malware from the affected system. Thus, the smart contracts are used to determine the actions required to contain malware.

In an embodiment of the present invention, a consensus of peers (devices used by stakeholders) in the blockchain is required to shut down systems that are affected (or has the potential to be affected) by the malware.

Thus, the presently-described blockchain based malware containment process: 1) provides a transparent way of associating relevant parties for containment of malware; 2) provides a consensus mechanism to reach a final outcome in a compliance sensitive environment; 3) provides easy auditable records of critical events while processing malware; and 4) provides a mechanism to enable business processes to monitor and contain malware. These features are not found in the prior art, and provide a new and significant improvement over the prior art for containing malware in a system.

In an embodiment of the present invention, the computer environment is a cloud environment. That is, the malware attacked network resource is a cloud-based network resource.

In one or more embodiments, the present invention is implemented using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but still is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one or more embodiments, it is managed by the organization or a third party and/or exists on-premises or off-premises.

Community cloud: the cloud infrastructure is shared by several organizations and supports a specific community that has shared concerns (e.g., mission, security requirements, policy, and compliance considerations). In one or more embodiments, it is managed by the organizations or a third party and/or exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 14:
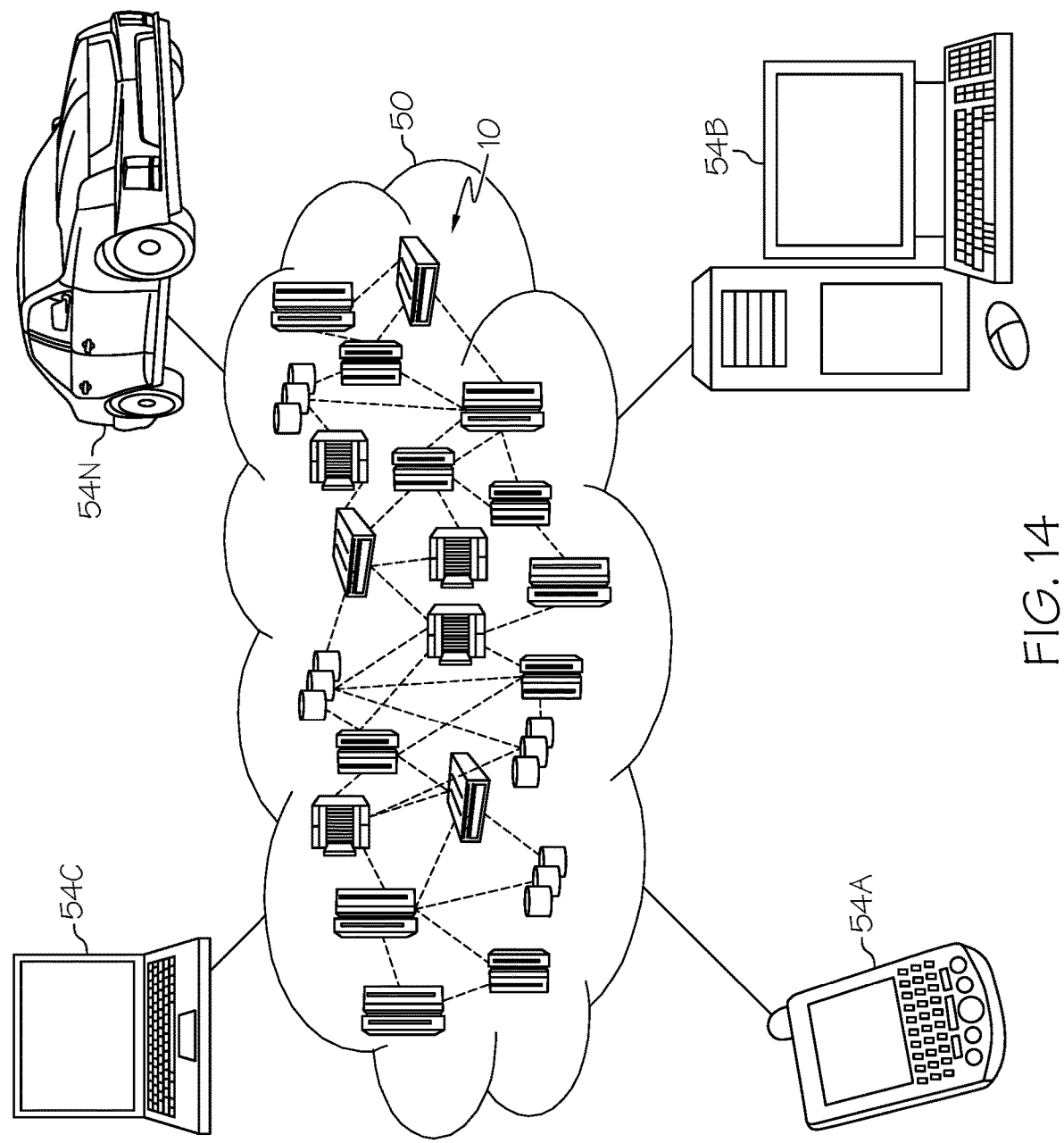
FIG. 14 depicts a cloud computing environment according to an embodiment of the present invention.

Referring now to FIG. 14, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate with one another. Furthermore, nodes 10 communicate with one another. In one embodiment, these nodes are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 14 are intended to be illustrative only and that computing nodes 10 and cloud computing environment 50 can communicate with any type of computerized device over any type of network and/or network addressable connection (e.g., using a web browser).

Figure 15:
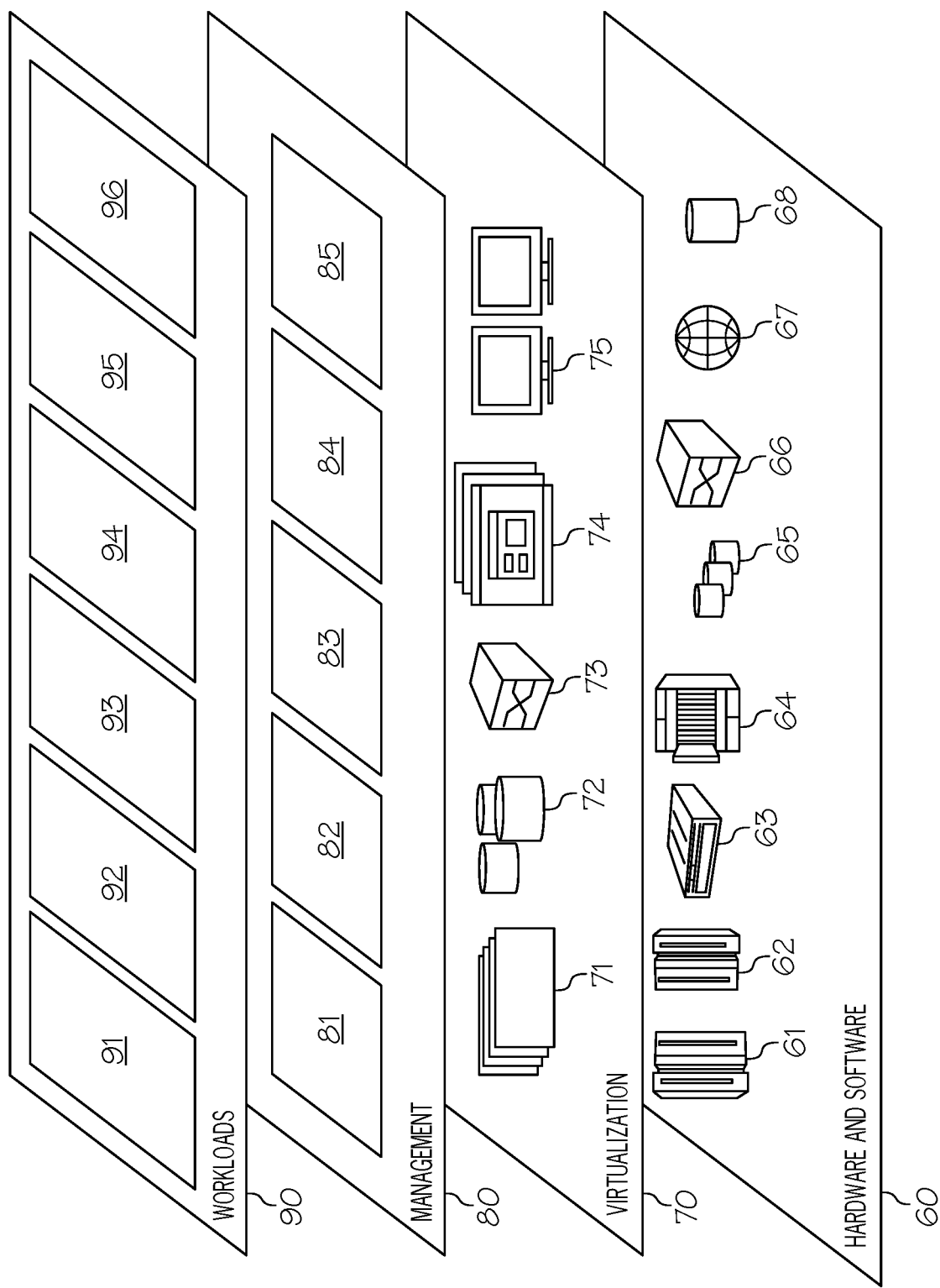
FIG. 15 depicts abstraction model layers of a cloud computer environment according to an embodiment of the present invention.

Referring now to FIG. 15, a set of functional abstraction layers provided by cloud computing environment 50 (FIG. 14) is shown. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities that are provided in one or more embodiments: virtual servers 71; virtual storage 72; virtual networks 73, including virtual private networks; virtual applications and operating systems 74; and virtual clients 75.

In one example, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment are utilized in one or more embodiments. Examples of workloads and functions which are provided from this layer include: mapping and navigation 91; software development and lifecycle management 92; virtual classroom education delivery 93; data analytics processing 94; transaction processing 95; and network resource malware isolation processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

In one or more embodiments of the present invention, any methods described in the present disclosure are implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, in one or more embodiments of the present invention any software-implemented method described herein is emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   establishing, by a blockchain system, a smart contract on the blockchain system for a network resource in a computer environment for an action to be performed on the network resource if a malware is detected in the network resource, wherein the computer environment is a network system that is a separate system from the blockchain system;
   in response to the malware being detected in the network resource, determining, by the blockchain system, whether a consensus is reached by a plurality of computers on the blockchain system to implement the action to contain the malware based on the smart contract; and
   in response to the consensus being reached by the plurality of computers, transmitting, from the blockchain system to the network resource, directions to implement the action on the network resource as specified by the smart contract.

2. The method of claim 1, further comprising:
   generating, by one or more processors, a network resource graph of the network resource, wherein the network resource graph depicts connections between nodes that depict network devices in the network resource;
   generating, by one or more processors, a dominant nodes graph of dominant nodes in the network resource graph, wherein the dominant nodes graph depicts a dominance frontier of the nodes in the network resource graph;
   applying, by one or more processors, a set of network resource policies on the dominant nodes graph in order to determine a set of paths from a source node to a destination node;
   applying, by one or more processors, a dominance frontier analysis from the source node to calculate sets of nodes in the network resource that can be affected by the malware;
   utilizing, by one or more processors, a machine learning system to determine potential malware spread pathways of the malware through resources depicted by the sets of nodes in the network resource that can be affected by the malware;
   determining, by one or more processors, a particular set of nodes, from the sets of nodes in the network resource that can be affected by the malware, that represent resources that need to be shut down based on a cost based model using a K-min cut algorithm; and
   shutting down, by one or more processors, the resources that are represented by the determined particular set of nodes.

3. The method of claim 1, wherein the network resource is a datacenter.

4. The method of claim 1, wherein the network resource is a component of a datacenter, and wherein the network resource is from the group consisting of a computer, a network port, a switch and a virtual machine used by the datacenter.

5. The method of claim 1, wherein the network resource is a datacenter, wherein the plurality of computers are used by a plurality of users that direct the blockchain system to establish the smart contract, and wherein the plurality of users comprise a client user of the datacenter, a cloud administrator of a cloud upon which the datacenter resides, a compliance officer for the datacenter, and a security manager for the datacenter.

6. The method of claim 1, wherein the smart contract codifies policies and requirements for network resource availability, network resource shutdown, and network resource incidence responses for the network resource.

7. The method of claim 1, wherein ledgers on the blockchain system keep track of malware propagation information about the malware, probabilistic indicators of compromise about the malware, and identification information about the malware.

8. The method of claim 1, wherein the computer environment is a cloud environment.

9. A computer program product for containing malware in a network resource, wherein the computer program product comprises a non-transitory computer readable storage device having program instructions embodied therewith, the program instructions readable and executable by a computer to perform a method comprising:
   establishing, by a blockchain system, a smart contract on the blockchain system for a network resource in a computer environment for an action to be performed on the network resource if a malware is detected in the network resource, wherein the computer environment is a network system that is a separate system from the blockchain system;
   in response to the malware being detected in the network resource, determining, by the blockchain system, whether a consensus is reached by a plurality of computers on the blockchain system to implement the action to contain the malware based on the smart contract; and
   in response to the consensus being reached by the plurality of computers, transmitting, from the blockchain system to the network resource, directions to implement the action on the network resource as specified by the smart contract.

10. The computer program product of claim 9, wherein the method further comprises:
    generating a network resource graph of the network resource, wherein the network resource graph depicts connections between nodes that depict network devices in the network resource;
    generating a dominant nodes graph of dominant nodes in the network resource graph, wherein the dominant nodes graph depicts a dominance frontier of the nodes in the network resource graph;
    applying a set of network resource policies on the dominant nodes graph in order to determine a set of paths from a source node to a destination node;
    applying a dominance frontier analysis from the source node to calculate sets of nodes in the network resource that can be affected by the malware;
    utilizing a machine learning system to determine potential malware spread pathways of the malware through resources depicted by the sets of nodes in the network resource that can be affected by the malware;

determining a particular set of nodes, from the sets of nodes in the network resource that can be affected by the malware, that represent resources that need to be shut down based on a cost based model using a K-min cut algorithm; and shutting down the resources that are represented by the determined particular set of nodes.

11. The computer program product of claim 9, wherein the network resource is a datacenter.

12. The computer program product of claim 9, wherein the network resource is a component of a datacenter, and wherein the network resource is from the group consisting of a computer, a network port, a switch and a virtual machine used by the datacenter.

13. The computer program product of claim 9, wherein the plurality of computers are used by a plurality of users that direct the blockchain system to establish the smart contract, wherein the network resource is a datacenter, and wherein the plurality of users comprise a client user of the datacenter, a cloud administrator of a cloud upon which the datacenter resides, a compliance officer for the datacenter, and a security manager for the datacenter.

14. The computer program product of claim 9, wherein the smart contract codifies policies and requirements for network resource availability, network resource shutdown, and network resource incidence responses for the network resource.

15. The computer program product of claim 9, wherein ledgers on the blockchain system keep track of malware propagation information about the malware, probabilistic indicators of compromise about the malware, and identification information about the malware.

16. The computer program product of claim 9, wherein the computer environment is a cloud environment.

17. The computer program product of claim 9, wherein the program instructions are provided as a service in a cloud environment.

18. A computer system comprising one or more processors, one or more computer readable memories, and one or more computer readable non-transitory storage mediums, and program instructions stored on at least one of the one or more computer readable non-transitory storage mediums for execution by at least one of the one or more processors via at least one of the one or more computer readable memories, the stored program instructions executed to perform a method comprising:

establishing a smart contract on a blockchain system for a network resource in a computer environment for an action to be performed on the network resource if a malware is detected in the network resource, wherein the computer environment is a network system that is a separate system from the blockchain system;

in response to the malware being detected in the network resource, determining whether a consensus is reached by a plurality of computers on the blockchain system to implement the action to contain the malware based on the smart contract; and in response to the consensus being reached by the plurality of computers, transmitting, to the network resource, directions to implement the action on the network resource as specified by the smart contract.

19. The computer system of claim 18, wherein the method further comprises:

generating a network resource graph of the network resource, wherein the network resource graph depicts connections between nodes that depict network devices in the network resource;

generating a dominant nodes graph of dominant nodes in the network resource graph, wherein the dominant nodes graph depicts a dominance frontier of the nodes in the network resource graph;

applying a set of network resource policies on the dominant nodes graph in order to determine a set of paths from a source node to a destination node;

applying a dominance frontier analysis from the source node to calculate sets of nodes in the network resource that can be affected by the malware;

utilizing a machine learning system to determine potential malware spread pathways of the malware through resources depicted by the sets of nodes in the network resource that can be affected by the malware;

determining a particular set of nodes, from the sets of nodes in the network resource that can be affected by the malware, that represent resources that need to be shut down based on a cost based model using a K-min cut algorithm; and shutting down the resources that are represented by the determined particular set of nodes.

20. The computer system of claim 18, wherein ledgers on the blockchain system keep track of malware propagation information about the malware, probabilistic indicators of compromise about the malware, and identification information about the malware.

* * * * *